US012769732B2

(12) United States Patent
Turlica et al.

(10) Patent No.: US 12,769,732 B2
(45) Date of Patent: Oct. 20, 2026

(54) LLM AGENT THAT GENERATES A STANDARDIZED DATA MODEL FROM NON STANDARDIZED DATA

(71) Applicant: MAINTAINX INC., Miami, FL (US)

(72) Inventors: Stefan Cristian Turlica, Miami, FL (US); Hugo Dozois-Caouette, Miami, FL (US); Mathieu Marengère-Gosselin, Montréal (CA); Marc-André Ruel, Longueuil (CA); Mathieu Lachance, Montréal (CA); Philippe Guay, Montréal (CA); Saif Kurdi-Teylouni, Saint-Laurent (CA)

(73) Assignee: MaintainX Inc., Miami, FL (US)

( * ) Notice: Subject to any disclaimer, the term of this patent is extended or adjusted under 35 U.S.C. 154(b) by 0 days.

(21) Appl. No.: 19/201,703

(22) Filed: May 7, 2025

(65) Prior Publication Data

US 2025/0348484 A1 Nov. 13, 2025

Related U.S. Application Data

(60) Provisional application No. 63/667,946, filed on Jul. 5, 2024, provisional application No. 63/644,798, filed on May 9, 2024.

(51) Int. Cl.

| | |
|---|---|
| ***G06F 16/2452*** | (2019.01) |
| ***G06F 16/35*** | (2025.01) |
| ***G06V 30/12*** | (2022.01) |

(52) U.S. Cl.
CPC ........ *G06F 16/24528* (2019.01); *G06F 16/35* (2019.01); *G06V 30/133* (2022.01)

(58) Field of Classification Search
CPC .. G06F 16/24528; G06F 16/35; G06V 30/133
See application file for complete search history.

(56) References Cited

U.S. PATENT DOCUMENTS 10,902,322 B2 * 1/2021 Sodhani ................. G06N 3/088
12,259,888 B2 * 3/2025 Subramanian ...... G06F 16/2455
(Continued)

FOREIGN PATENT DOCUMENTS

WO 2014177902 11/2014
WO 2023150690 8/2023

OTHER PUBLICATIONS

Demertzi, V.; Demertzis, S.; Demertzis, K. An Overview of Cyber Threats, Attacks and Countermeasures on the Primary Domains of Smart Cities. Appl. Sci. 2023, 13, 790. https://doi.org/10.3390/app13020790 (Year: 2023).*
(Continued)

*Primary Examiner* — Matthew J Ellis
(74) *Attorney, Agent, or Firm* — Van Pelt, Yi & James LLP

(57) ABSTRACT

A large language model (LLM) agent standardizes asset metadata and facilitates access to the resulting standardized data via one or more application programming interfaces (APIs). The LLM agent receives non-standardized data that includes first asset metadata describing a first asset and second asset metadata describing a second asset. The first asset metadata is obtained from a first domain and has a first format, and the second asset metadata is obtained from a second domain and has a second format. The data also includes sensor data. The LLM agent converts the different formats into a standardized format, resulting in generation of first standardized data. The LLM agent generates a data model that includes the standardized data and performance trend data. The LLM agent provides access to the data model via one or more APIs.

20 Claims, 18 Drawing Sheets

(56) References Cited

U.S. PATENT DOCUMENTS

| | | | | |
|---|---|---|---|---|
| 2005/0171941 | A1 * | 8/2005 | Chen | G16H 10/60 |
| 2009/0222809 | A1 | 9/2009 | Krig | |
| 2009/0321511 | A1 | 12/2009 | Browne | |
| 2013/0144833 | A1 * | 6/2013 | Ivanova | G06F 16/9535 707/600 |
| 2018/0067734 | A1 | 3/2018 | Prasad | |
| 2018/0299878 | A1 | 10/2018 | Cella | |
| 2020/0349626 | A1 * | 11/2020 | Lagoni | G06F 16/3349 |
| 2020/0387818 | A1 | 12/2020 | Chan | |
| 2021/0176116 | A1 | 6/2021 | Sharma | |
| 2022/0237368 | A1 | 7/2022 | Tran | |
| 2023/0006890 | A1 | 1/2023 | Allsbrook | |
| 2023/0267273 | A1 * | 8/2023 | Theriappan | G06N 5/022 704/9 |
| 2023/0316261 | A1 | 10/2023 | Agbamu | |
| 2023/0326212 | A1 * | 10/2023 | Chawda | G06V 10/82 382/103 |
| 2024/0061866 | A1 * | 2/2024 | Sehon | G06F 16/367 |
| 2024/0195841 | A1 * | 6/2024 | Crabtree | G06F 16/951 |
| 2025/0004451 | A1 | 1/2025 | Hua | |
| 2025/0016128 | A1 * | 1/2025 | Wheeler | G06N 20/00 |
| 2026/0073432 | A1 | 3/2026 | Burdis | |
| 2026/0079480 | A1 | 3/2026 | Salma | |
| 2026/0112096 | A1 | 4/2026 | Ramkumar | |

OTHER PUBLICATIONS

Victor Pellegrain, Harnessing the Power of Multimodal and Textual Data in Industry 4.0, Doctoral dissertation, Universite Paris-Saclay, Jul. 4, 2023, 201 pages, https://theses.hal.science/tel-04280319/file/115657_PELLEGRAIN_2023_archivage.pdf.

* cited by examiner

| Reference | Name |
|---|---|
| AV | Air outlet valve |
| Ca | Air cooler |
| Co | Oil cooler |
| CV/Vs | Check valve/oil stop valve |
| E | Compressor element |
| ER | Elektronikon /Elektronikon Graphic controller |
| FN | Cooling fan |
| M1 | Drive motor |
| S3 | Emergency stop button |
| UA | Unloader |
| Da (Dm) | Condensate outlets |

Non-Standardized Data Structure 330

LLM AGENT THAT GENERATES A STANDARDIZED DATA MODEL FROM NON STANDARDIZED DATA

CROSS-REFERENCE TO RELATED APPLICATIONS

This application claims the benefit of and priority to U.S. Provisional Patent Application Ser. No. 63/644,798 filed on May 9, 2024 and entitled "GENERATIVE AI THAT FACILITATES PREVENTATIVE MAINTENANCE," which application is expressly incorporated herein by reference in its entirety. This application also claims the benefit of and priority to U.S. Provisional Patent Application Ser. No. 63/667,946 filed on Jul. 5, 2024 and entitled "DETECTION AND PREVENTION OF EQUIPMENT FAILURE USING OPERATIONAL DATA," which application is expressly incorporated herein by reference in its entirety.

BACKGROUND

A "large language model" (LLM) is a specialized type of machine learning (ML) or artificial intelligence (AI) model that has been trained on a large set of data. The data can be of any type, though it is often text-based data. Image data, video data, and other data types can also be used. With its training, the LLM is able to understand and produce output that resembles human-generated output. As various examples, an LLM can be tasked with translating input from one language (e.g., perhaps English) to another language (e.g., perhaps Spanish). LLMs can be tasked with answering questions, writing code, analyzing language patterns, and writing creative content. LLMs can be involved with an "agent."

An "agent" is a type of system or service that leverages one or more LLMs to perform a task, which refers to a unit of work that needs to be performed. Notably, an agent is a type of autonomous system that can "think" and act on its own; meaning, it can operate without specific instructions from a user. In some scenarios, an agent has a defined goal (either set by a user or a developer), and the agent can select an appropriate strategy to accomplish a given task using available tools.

An LLM will respond to a question if asked. For instance, if an LLM is asked: "What is the price of a plane ticket to Machu Pichu?" the LLM can generate a response. An agent, on the other hand, can not only provide a response, but it can also go about scheduling and paying for the flight. The agent can also book a hotel and vehicular travel arrangements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for standardizing asset metadata and for facilitating access to the resulting standardized data via one or more application programming interfaces (APIs), said method being implemented by a service and including: receiving non-standardized data including data that includes: (i) first asset metadata describing a first asset and second asset metadata describing a second asset, said first asset metadata being obtained from a first domain and having a first format and said second asset metadata being obtained from a second domain and having a second, different format, and (ii) first sensor data obtained from one or more sensors associated with the first asset and second sensor data obtained from one or more sensors associated with the second asset; converting the first format of the first asset metadata, which is included in the non-standardized data, into a standardized format, resulting in generation of first standardized data, wherein the first standardized data is included in a first hierarchically organized data structure including a plurality of defined categories into which various portions of the first standardized data are categorized; converting the second format of the second asset metadata, which is also included in the non-standardized data, into the same standardized format, resulting in generation of second standardized data, wherein the second standardized data is included in a second hierarchically organized data structure that also includes the same plurality of defined categories into which various portions of the second standardized data are also categorized; generating a first performance trend for the first asset using the first sensor data; generating a second performance trend for the second asset using the second sensor data; generating a data model that includes the first standardized data, the second standardized data, the first performance trend, and the second performance trend; and providing access to the data model via one or more APIs.

In some aspects, the techniques described herein relate to a computer system that standardizes asset metadata and that facilitates access to the resulting standardized data via one or more application programming interfaces (APIs), said computer system including: a processor system; and a storage system that stores instructions that are executable by the processor system to cause the computer system to: receive non-standardized data including data that includes: (i) first asset metadata describing a first asset and second asset metadata describing a second asset, said first asset metadata being obtained from a first domain and having a first format and said second asset metadata being obtained from a second domain and having a second, different format, and (ii) first sensor data obtained from one or more sensors associated with the first asset and second sensor data obtained from one or more sensors associated with the second asset; convert the first format of the first asset metadata, which is included in the non-standardized data, into a standardized format, resulting in generation of first standardized data, wherein the first standardized data is included in a first hierarchically organized data structure including a plurality of defined categories into which various portions of the first standardized data are categorized; convert the second format of the second asset metadata, which is also included in the non-standardized data, into the same standardized format, resulting in generation of second standardized data, wherein the second standardized data is included in a second hierarchically organized data structure that also includes the same plurality of defined categories into which various portions of the second standardized data are also categorized; generate a first performance trend for the first asset using the first sensor data; generate a second performance trend for the second asset using the second sensor data; generate a data model that includes the first standardized data, the second standardized data, the first performance trend, and the second performance trend; and provide access to the data model via one or more APIs.

In some aspects, the techniques described herein relate to one or more hardware storage devices that store instructions that are executable by one or more processors to cause the one or more processors to: receive non-standardized data including data that includes: (i) first asset metadata describing a first asset and second asset metadata describing a second asset, said first asset metadata being obtained from a first domain and having a first format and said second asset metadata being obtained from a second domain and having a second, different format, and (ii) first sensor data obtained from one or more sensors associated with the first asset and second sensor data obtained from one or more sensors associated with the second asset; convert the first format of the first asset metadata, which is included in the non-standardized data, into a standardized format, resulting in generation of first standardized data, wherein the first standardized data is included in a first hierarchically organized data structure including a plurality of defined categories into which various portions of the first standardized data are categorized; convert the second format of the second asset metadata, which is also included in the non-standardized data, into the same standardized format, resulting in generation of second standardized data, wherein the second standardized data is included in a second hierarchically organized data structure that also includes the same plurality of defined categories into which various portions of the second standardized data are also categorized; generate a first performance trend for the first asset using the first sensor data; generate a second performance trend for the second asset using the second sensor data; generate a data model that includes the first standardized data, the second standardized data, the first performance trend, and the second performance trend; provide access to the data model via one or more APIs; and via the one or more APIs and the data model, facilitate at least one of: (i) identification of an anomaly of the first asset based, at least in part, on the first performance trend, (ii) forecast when a part of the first asset is due for replacement, (iii) identify an alternative replacement part for the first asset, where the alternative replacement part is an alternative for an original equipment manufacturer (OEM) part for the asset, or (iv) modification of a performance of the first asset, where the modification of the performance is based on a determination that said modification will result in a prolonging of a lifespan of the first asset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
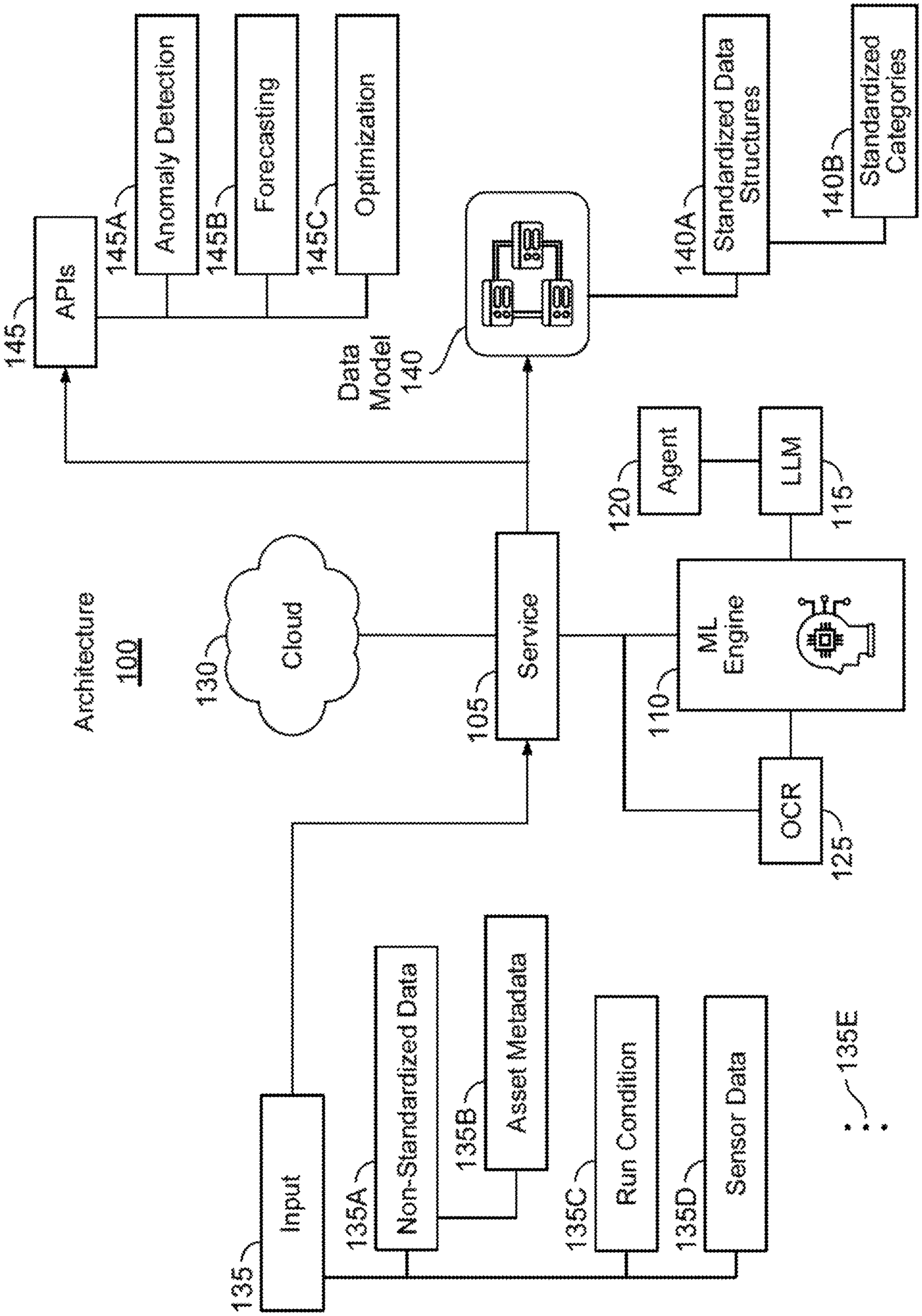
FIG. 1 illustrates an example computing architecture for generating a standardized data model.

Many industries, such as the manufacturing industry, rely on different assets (e.g., units of equipment) to operate. As various examples, these units may include conveyor belts, climate control systems (e.g., HVAC), pressurized equipment, and so on. It is often mission critical for consumers that their equipment operates correctly, predictably, and safely.

There are various different strategies involving the maintenance of an asset. For instance, these strategies include a reactive maintenance strategy, a periodic maintenance strategy, a proactive maintenance strategy, and a predictive (aka preventative) maintenance strategy. The reactive strategy involves fixing an asset after the asset fails. The periodic strategy involves scheduling maintenance at a periodic rate. The proactive strategy involves attempting to eliminate issues at an early stage. The preventative/predictive strategy involves using analytics to predict when an asset will fail and taking actions before that failure. Often, the best strategy involves a combination of all four of these strategies. The embodiments disclosed herein are generally directed to the training and employment of an LLM agent to facilitate all of the above maintenance strategies for an asset. As a prerequisite to properly maintaining an asset, one must understand what actions are needed to facilitate that maintenance. Often, the maintenance procedures are included in an OEM (original equipment manufacturer) manual.

Essentially every asset manual is different, especially between different OEMs. Historically, there has not been a standardized way to structure the information inside the multitude of different OEM manuals.

For example, a particular OEM might always have a specification sheet in the pages following the table of content of a manual while another might have safety measures at that location. With the help of expert LLM (large language model) agents, the disclosed embodiments ensure that this information is resurfaced in a proper manner in order for other LLM agents to be more equipped at extracting specific information, such that each parsing and extraction step outputs a similarly ordered output, thereby resulting in a standardized organization of the data. Another example would be to extract sections of the document (e.g., the table of content or glossary) and expose them as specific tools to assist during the data retrieval process. The extraction process could then use these tools to find the information more easily.

Technical Benefits and Advantages

The disclosed embodiments bring about numerous benefits, advantages, and practical applications to improving the efficiency (e.g., by reducing latency or downtime) and longevity of physical assets. The disclosed embodiments also help reduce latency in terms of the maintenance operations. What that means is that the assets are down for a shorter duration, thereby allowing them to operate longer to produce valuable output.

As one example advantage, the disclosed embodiments help to optimize resources used to preventively maintain assets to help mitigate failure, to help avoid downtime, and to extend their lifespans. Without the embodiments, there is a significant amount of guesswork when trying to optimize the complex ecosystem of a manufacturing and industrial environment. With a finite number of resources (e.g., person-hours, spare parts, money, etc.), it is not a trivial task to determine what the likely assignment and order of things should be to minimize resource usage while maximizing the outcome (e.g., minimize spend, maximize equipment uptime and lifetime, etc.).

As various examples, consider the following scenarios: should task A come before task B? Should worker X be assigned to task A, or should it be worker Y, and then worker X could be assigned to task B? When should each of these tasks be performed to optimize for available resources such as personnel and spare parts and with the goal of reducing risk such as working on a piece of equipment that is not on a critical path, and/or that is more likely to go down sooner?

Multiple industries have started capturing data from their operations, mostly through sensors and digitized standard operating procedures run by technicians. This has minimally allowed them easier access and greater visibility on operational data and audit trails of their operations. Some of these industries have leveraged these sensors and manually input readings to generate real-time reactive alerts based on thresholds and triggers to try to prevent impending issues and breakdowns.

Other industries have leveraged historical data to apply AI and ML techniques to extract simplistic patterns and trends and to gain simplistic insights into what they could do differently in the future to optimize for their desired outcomes. One thing that is missing with these traditional approaches, however, is a holistic system that can make real-time recommendations and systemic modifications based on all these input variables and the desired outcomes. As mentioned above, by implementing the disclosed principles, significant improvements in lifespan and reduction in latency are achieved.

Without expert knowledge on a specific asset, it is quite challenging to prepare and organize all the work associated with that asset. To balance the work between reactive maintenance to preventative maintenance, owners are sometimes left with guessing the work to be done. This guesswork can lead to unplanned downtime or loss in money and time by over or under maintaining the asset.

With proactive maintenance task forecasting, the disclosed embodiments beneficially remove the guesswork and offer tailor-made work recommendations for a given asset based on OEM recommendations, sensor data, actual work made on a specific machine, and trend in usage across the market. Task forecasting, which is included as a part of the disclosed preventative maintenance operations, can be split into multiple different categories. One category involves work forecasting, which includes optimizing the moment when a maintenance task is to be done on a given asset (e.g., before a failure but close enough to not lose efficiency). Another category involves parts forecasting, which includes recommending inventory restock according to asset status/health and recommending more appropriate parts to use (e.g., parts that are more economical, parts that perhaps deviate from original OEM recommendations but that have proven to be valuable, etc.). Another category involves asset lifecycle management, which includes recommending new work, optimizing resources, and recommending knowledge transfer.

Making sure parts required for a given work are available is also a challenging problem. On one side, systems can try to have all the parts always in stock (even the ones rarely used) or, on the flip side, systems can order parts only when required. The first option is quite costly while the second one can be subject to adding major delays and potentially longer downtimes.

With proactive parts usage forecasting, the disclosed embodiments beneficially ensure that work that needs to be done on a given asset can be done without any delays and at lower cost by making sure that parts that are required are available at the right time (e.g., not too early but also not too late). To ensure this, the disclosed embodiments ensure that a proper purchase order is created when past trends of an asset indicate it should be restocked and/or when an analysis of real time sensor data indicates a potential upcoming failure. The order is assigned to the most relevant user based on organization historical data in order to proactively handle parts refill. The embodiments also beneficially ensure that the proper part is being ordered based on OEM recommendations, market popularity, and cross organizational trend analysis for cost efficiency. The embodiments further beneficially ensure that a proper purchase/work order is created based on asset sensor data and historical work order history in order to preemptively handle fault occurrences.

One objective of the disclosed embodiments is to detect fault patterns early and prevent equipment from failing by addressing potential failure root causes before they occur, thus preserving the equipment's uptime while extending its lifetime and reducing costs, both immediate but also in the long run. Accordingly, these and numerous other benefits will now be described in more detail throughout the remaining portions of this disclosure.

Example Embodiments

Having just described some of the high level benefits, advantages, and practical applications achieved by the disclosed embodiments, attention will now be directed to FIG. 1, which illustrates an example computing architecture 100 that can be used to achieve those benefits. Architecture 100 includes a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include an ML or AI engine, such as ML engine 110. The ML engine 110 enables the service 105 to operate even when faced with a randomization factor. The ML engine 110 can also include or be associated with an LLM 115. Additionally, an LLM agent 120 can operate on top of the LLM 115 and can be included as a part of the ML engine 110. Thus, in some implementations, service 105 is implemented as or at least includes the LLM agent 120. As used herein, the phrases "service" and "LLM agent" (or simply "agent") can be used interchangeably. It should be noted how the service/agent are able to use various application programming interfaces (APIs) as well as the disclosed data model to perform various actions. The APIs typically are not structured to perform specific actions; rather, the APIs provide the service/agent the interface for communicating with the disclosed data model to achieve a specific desired outcome.

LLM agent 120 can include or be associated with memory and any number of different tool(s) or APIs 145 (to be discussed in more detail later), which refer to specialized utility, tooling, or functionality defined for the agent 120 to use. As will be described in more detail later, service 105 is generally tasked with building a data model 140 (aka a "preventative maintenance library") that is usable via the various APIs 145 to achieve specific functionalities. This data model 140 is comprised of standardized asset data that has been formatted in a specific manner, thereby forming a specific type of data structure. Thus, service 105 facilitates the transformation of data from one structure, domain, and format to a different structure, domain, and format.

As used herein, reference to any type of machine learning, LLM, LLM agent, or artificial intelligence can include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), generative pre-trained transformer (GPT), long short-term memory networks, K-means clustering, isolation forests, autoencoders, gaussian process regression, ensemble methods, or any other type of intelligent computing system. Any amount of training data can be used (and perhaps later refined) to train the machine learning algorithm to dynamically perform the disclosed operations.

In some implementations, service 105 is a cloud service operating in a cloud 130 environment. In some implementations, service 105 is a local service operating on a local device. In some implementations, service 105 is a hybrid service that includes a cloud component operating in the cloud 130 and a local component operating on a local device. These two components can communicate with one another.

As mentioned above, service 105 is tasked with standardizing asset metadata (e.g., any information associated with an asset, including OEM manual information, Internet data about the asset, forum data, social media data, etc.) and for facilitating access to and use of the resulting standardized data via one or more APIs. For instance, service 105 receives input 135, which can include non-standardized data 135A. In some scenarios, the input 135 is obtained from OEM manuals, non-OEM manuals, Internet data, forums, social media data, and so on, without limit.

This non-standardized data 135A comprises data that includes: (i) first asset metadata (e.g., included in asset metadata 135B) describing a first asset and second asset metadata (also included in the asset metadata 135B) describing a second asset. The first asset metadata is obtained from a first domain and has a first format. Similarly, the second asset metadata is obtained from a second domain and has a second, different format. FIGS. 2A, 2B, 3A, 3B, and 3C are illustrative. It is worthwhile to note how the examples shown in FIGS. 2A and 3A relate to household assets. In contrast, the example shown in FIGS. 3B and 3C relate to an industrial asset in the form of a compressor. One will appreciate how any type of asset and any type of data can be operated on using the principles disclosed herein. Thus, the disclosed principles should not be interpreted in a limited or myopic manner with regard to the type of asset being operated on.

Figure 2A:
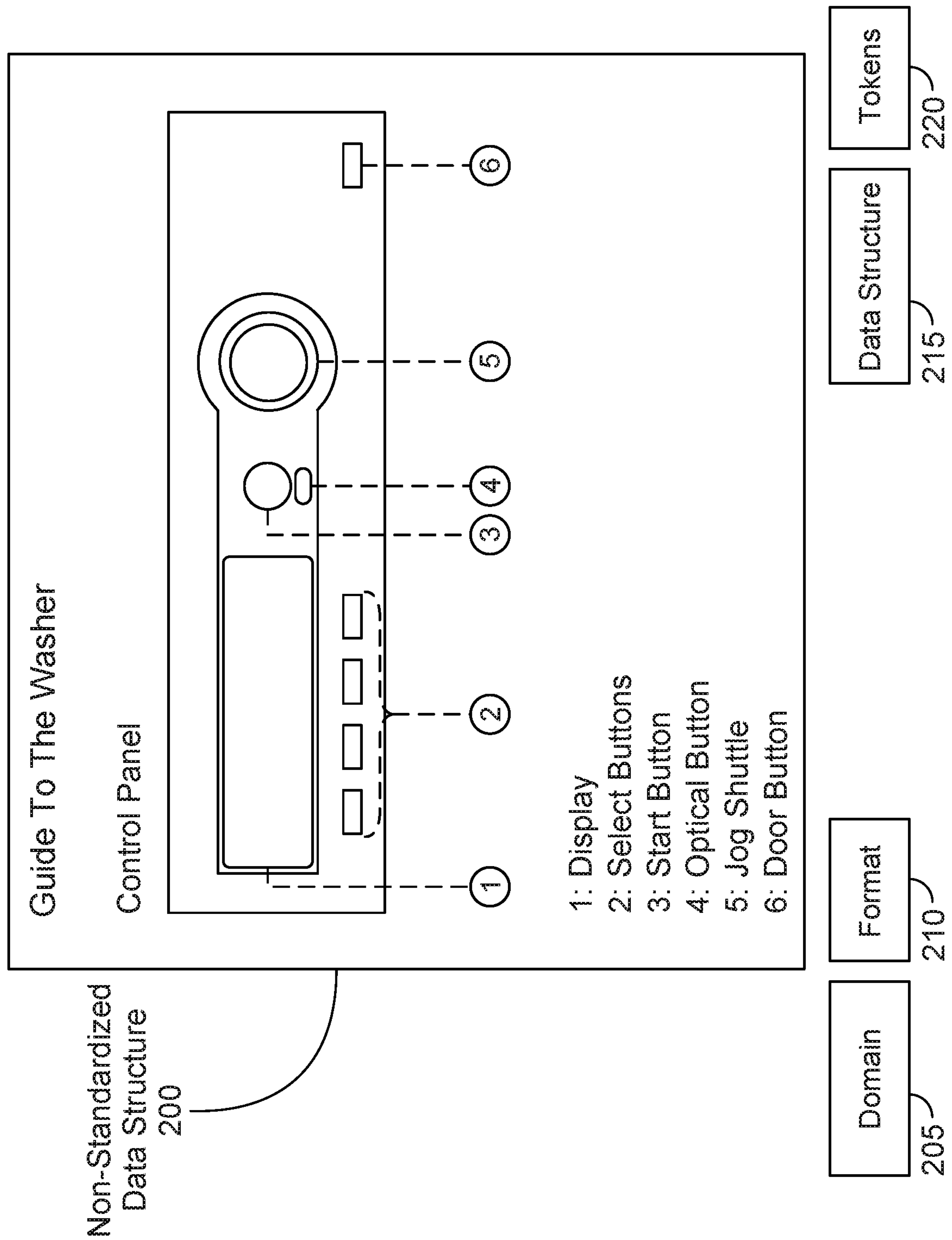
FIGS. 2A and 2B illustrate examples of a non-standardized data structure.

To illustrate, FIG. 2A shows a non-standardized data structure 200 that can be included in the non-standardized data 135A of FIG. 1. The non-standardized data structure 200 is in the form of a user manual for a given asset (e.g., a washing machine). Thus, the domain 205 for this non-standardized data structure 200 is a user manual domain. One will appreciate how other domains exist, such as parts list domains, maintenance domains, user forum domains, social media domains, website domains, and so on without limit.

Different techniques can be used to acquire the non-standardized data structure 200. In some instances, an Internet crawl is performed or facilitated by the LLM agent 120 to detect the non-standardized data structure 200. In some instances, the non-standardized data structure 200 is entered as input by a user.

The non-standardized data structure 200 is also shown as having a given format 210. Notably, each OEM formats and structures its documentation in a particular way that is often different relative to other OEM formats and that is sometimes different relative to other assets made by the same OEM. Additionally, the type of information and the level of details or granularity is often different from one OEM document to another. Keeping up-to-date with this documentation is an arduous process. Furthermore, when existing documents are revised, it is desirable that those new versions are tracked in order to stay up-to-date. Some documents are not even digitalized. Compounding on those challenges, it is also often the case that these OEM documents are hundreds of pages long.

The disclosed embodiments aim at automating the parsing, extracting, and tracking process of this documentation. Also, as users work with the assets, they often develop new techniques and alternatives to the recommendations provided by the OEMs in their documentation. Taking into account the tribal knowledge of the work done on these assets is another beneficial aspect of the disclosed embodiments.

In some scenarios, the OEM manual is included in a landing page or other type of webpage for a client. The LLM agent 120 can be tasked to periodically monitor the OEM's webpage to detect when a new version of an OEM manual is made public. When that new version is made public, the LLM agent 120 can optionally perform a document comparison to identify the deltas that exist between the earlier version of the document and the new version of the document. These deltas can then be used to supplement or update the information used by the LLM agent 120. In some scenarios, the LLM agent 120 simply replaces the old version with the new version of the OEM document. Thus, in some scenarios, the LLM agent 120 is tasked with periodically querying and monitoring a given website in an attempt to identify when revision or version changes to an OEM document occur.

In FIG. 2A, this particular user manual begins by providing a visual illustration of the control panel for the washer. The figure representing the control panel describes the various components on the control panel and their intended purpose. Later on (not illustrated), the user manual includes other sections describing the preferred manner of use for the washer. The user manual also includes a safety section outlining safe practices for the user to employ. Thus, this user manual is organized in a specific format 210 that likely is unique relative to formats of other manuals.

Figure 3A:
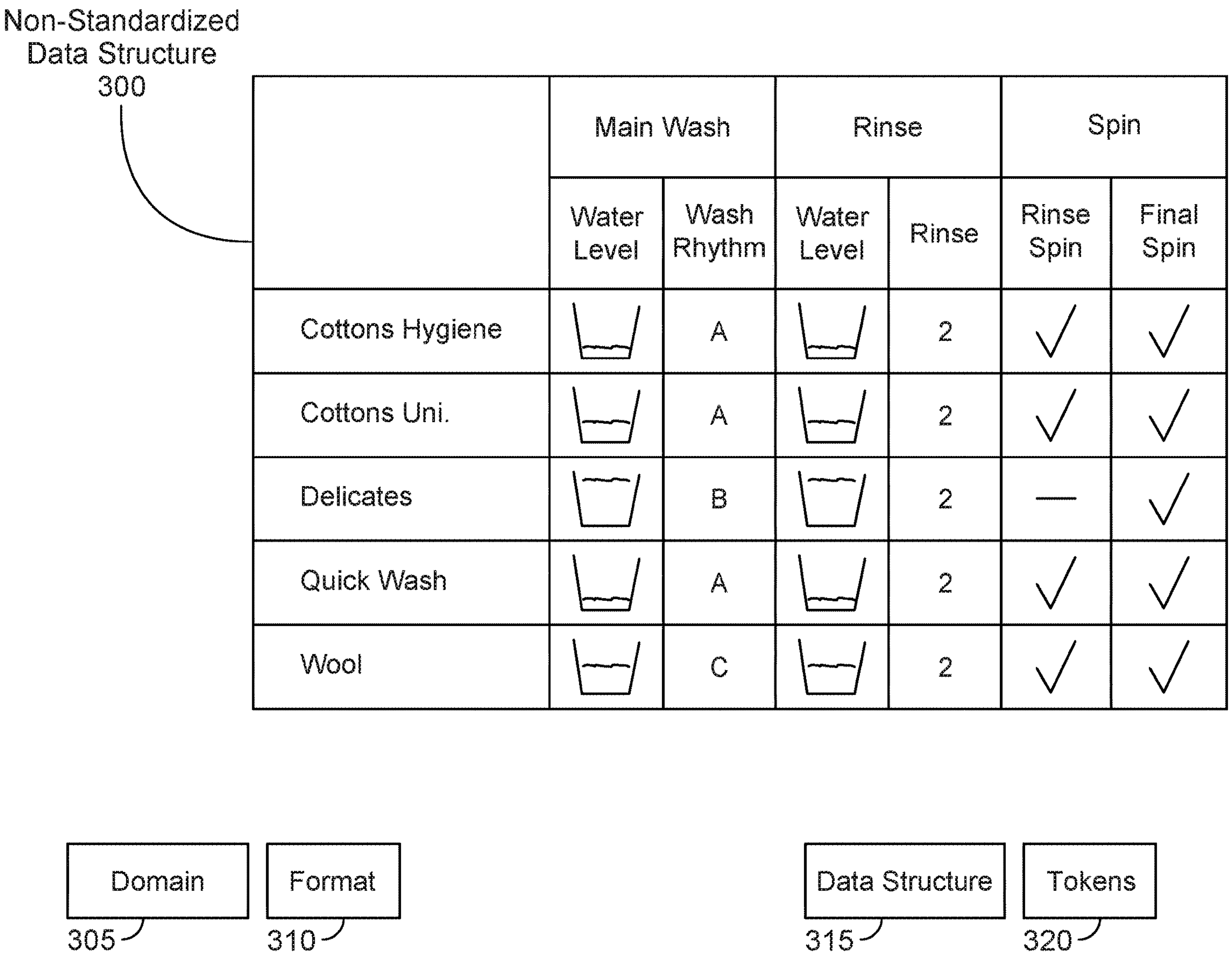
FIGS. 3A, 3B, and 3C illustrate other examples of a non-standardized data structures and assets.

FIG. 3A, on the other hand, shows a different non-standardized data structure 300 for a different washing machine. The domain 305 for this non-standardized data structure 300 may be the same as the domain 205, or it may be different. As one example, this domain 305 might be a quick user set of instructions as opposed to a full manual. Notice also, the format 310 for the non-standardized data structure 300 is quite different than the format 210 of FIG. 2A. In FIG. 3A, the non-standardized data structure 300 begins by illustrating various wash types or cycles that can be performed by this washer.

Figure 3B:
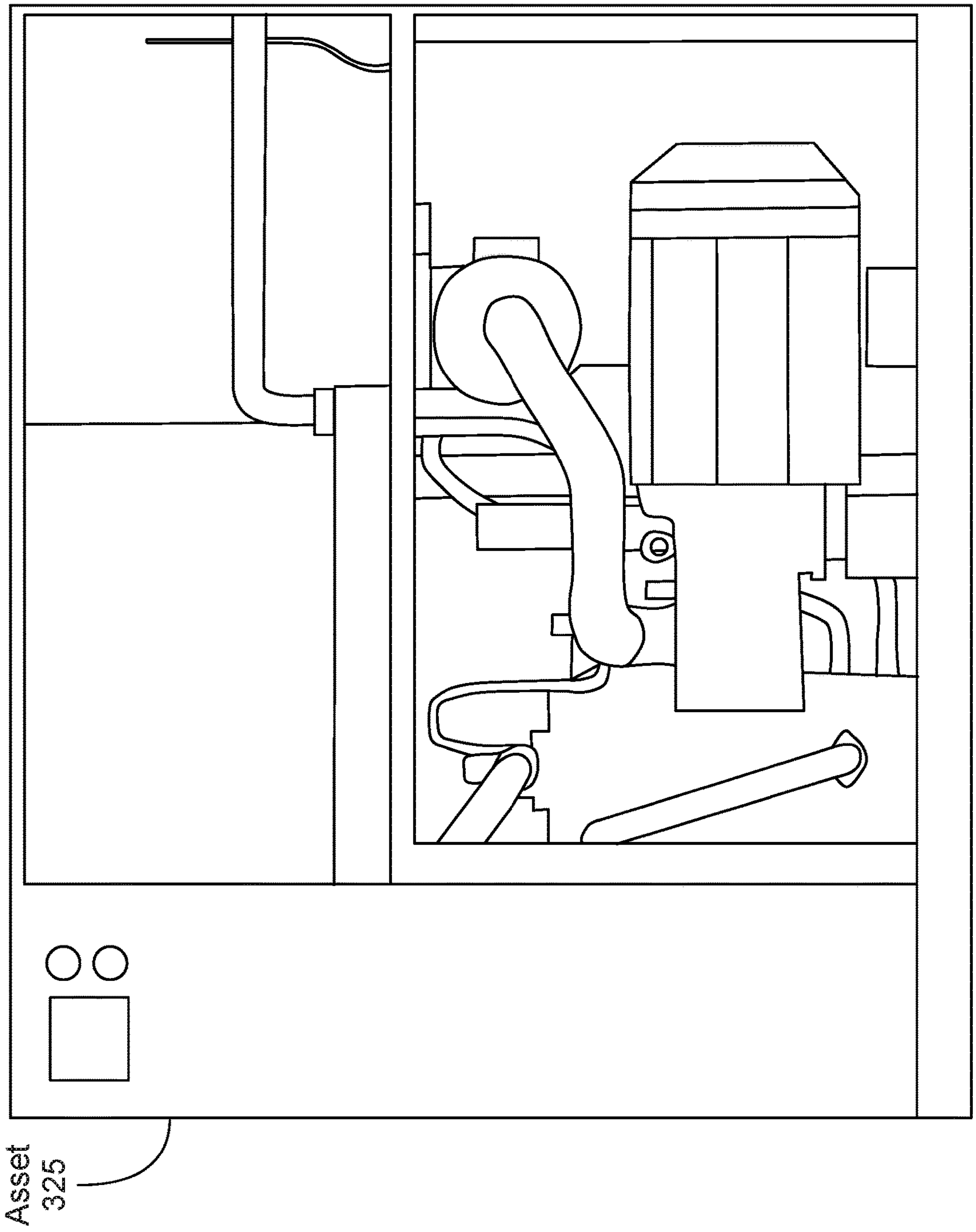
Figure 3C:
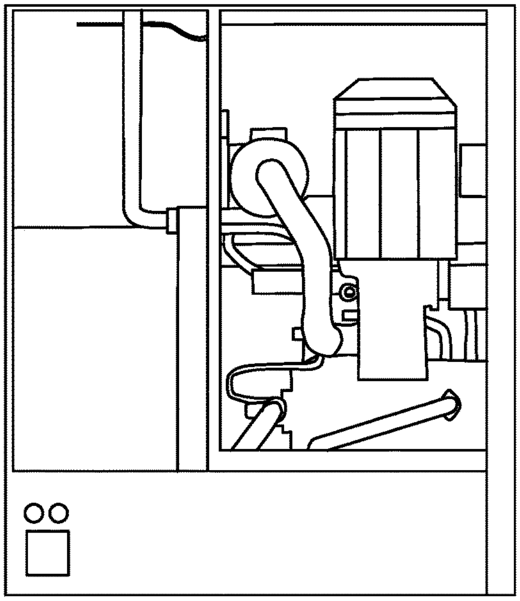

FIG. 3B shows a different asset 325 in the form of a compressor. FIG. 3C shows the corresponding non-standardized data structure 330 for the asset 435 of FIG. 3B. Whereas FIGS. 2A and 3A showed examples of common household assets, FIG. 3B shows an example of an industrial type of asset. One will appreciate how the disclosed principles can be employed for any type of asset, whether it is an industrial asset, a household asset, or any other type of asset. As another example, the disclosed principles can be employed, in one example scenario, to change the oil filter in the compressor of FIG. 3B. Similarly, the non-standardized data structure 330 of FIG. 3C can include various pressure bands that can be set for the compressor.

Returning to FIG. 1, the input 135 received by the service 105 can further include a run condition 135C for the various assets as well as sensor data 135D for the various assets. Regarding the run condition 135C data, this data can include any data besides the sensor data 135D. For instance, the run condition 135C might include a technician's report on the current condition and status of the asset. The run condition 135C can further include location details for the asset, owner information, and so on.

The sensor data 135D may include sensor data obtained from any sensor associated with a given asset. The sensors may be integrated with the asset or they may be external to the asset, such as environmental sensors that are located externally relative to the asset but that measure the environmental conditions in which the asset is operating. The ellipsis 135E demonstrates how the input 135 may include any other input, without limit (e.g., feedback data, technician data, etc.). For instance, the additional input can include, but certainly is not limited to, various libraries of manuals, publicly available asset information, OEM data, forum data, social media data, historical work order and purchase order information, Internet crawled information, and so on.

Figure 4:
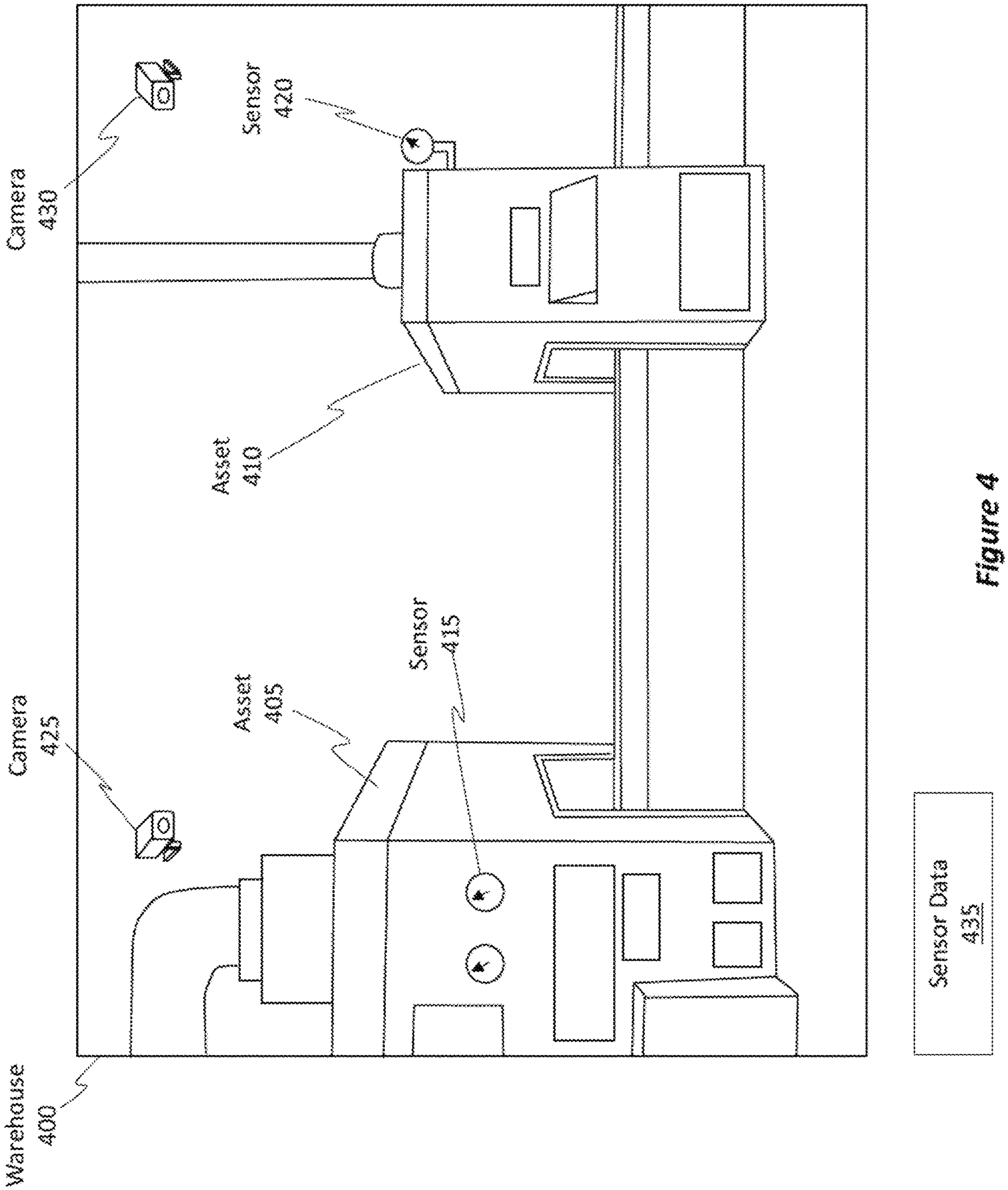
FIG. 4 illustrates various sensors.

FIG. 4 provides some additional examples related to the sensor data 135D. FIG. 4 shows a warehouse 400 that includes a first asset 405 and a second asset 410. Of course, any number of assets can be involved in the disclosed principles. FIG. 4 also shows various sensors, such as sensor 415 and sensor 420. The cameras (e.g., camera 425 and camera 430) are also considered sensors. The sensors are generating sensor data 435. This sensor data 435 may be generated at a location that is remote relative to where the service 105 of FIG. 1 is disposed or the sensor data 435 may be generated at the same location where service 105 is located. If remote, then the sensor data 435 can be transmitted over one or more networks to the service 105.

The sensor data 435 may be of any type. Example types of the sensor data 435 include, but are not limited to, numerical data, alphanumeric data, text data, image data, video data, depth data, spectral analysis data, pressure data, temperature data, flow data, speed data, and so on.

The embodiments can be utilized in a wide range of industrial sectors where machinery and equipment are heavily relied upon. For instance, in the manufacturing industry, the disclosed system can be integrated into the production line to monitor the health of machines and prevent unexpected breakdowns, thereby improving efficiency and reducing downtime.

The disclosed embodiments are designed to monitor a variety of industrial equipment including, but not limited to, motors, pumps, compressors, turbines, fans, blowers, gearboxes, conveyors, and CNC machines. It may also be applicable to robotic arms, automated guided vehicles (AGVs), and other automated machinery used in manufacturing and processing industries.

The disclosed embodiments can tap into the operational data of the industrial equipment. The embodiments tap into the operational data of the industrial equipment by interfacing with the PLC and other control systems that manage the equipment's operations. In some aspects, the embodiments may utilize a combination of direct data connections, such as through industrial communication protocols like MQTT, Sparkplug, Modbus, Profibus, or Ethernet/IP, and indirect methods, such as through API calls to existing databases or data historians that store operational data. The system may also include additional sensors that are installed on the equipment to capture physical and analog data, which is then synchronized with the data obtained from the PLC to provide a comprehensive view of the equipment's performance and condition. Thus, data from multiple different sensors can be combined or reviewed together to infer conditions that may not be observable from the review of only a single source of sensor data.

As one example, consider a scenario involving three different sensors. Individually, the readings from these sensors may not indicate a fault or problem has occurred. When combined or reviewed in combination with one another, however, service 105 can infer that a fault has occurred or is likely to occur in the near future. Thus, service 105 can infer conditions based on the combination of data where, if that data were reviewed individually, those conditions might not be inferable.

The system can monitor parameters in the operational data. The system monitors a variety of parameters in the operational data, which may include but are not limited to: rotational speed, torque, power output, electrical current, voltage levels, temperature readings, pressure levels, fluid flow rates, vibration frequencies, vibration amplitude, acoustic emissions, and chemical composition of lubricants. These parameters are indicative of the equipment's health and performance, and changes in these parameters can signal the onset of potential issues or malfunctions.

The system can detect trends and patterns of wear and tear on different subsystems and parts of the equipment. The system employs advanced data analytics, machine learning algorithms, and digital signal processing (DSP) techniques to analyze the collected operational data and sensor readings. In some aspects, the system may utilize statistical analysis, pattern recognition, and predictive modeling in conjunction with various DSP methods to identify deviations from normal operational patterns that may indicate wear and tear.

By continuously monitoring the equipment, the system can detect subtle changes in the parameters that may not be immediately apparent to human operators. These changes are then processed using DSP techniques such as Fourier transforms, wavelet analysis, and time frequency analysis to extract meaningful features from the raw signals. The processed data is then correlated with historical data and known failure modes to identify trends and patterns that may signal the onset of equipment degradation or impending failure. Thus, in some scenarios, service 105 transforms data in one domain (e.g., perhaps the time domain) into a different domain (e.g., perhaps the frequency domain) to identify faults and deviations in behavior.

The system may also use advanced DSP-based anomaly detection techniques, such as spectral kurtosis and envelope analysis, to identify outliers in the data that could indicate a malfunction. These techniques are particularly effective in detecting faults in rotating machinery by analyzing the frequency content of vibration signals.

At least some embodiments can also employ a sophisticated array of filtering algorithms to enhance the quality and reliability of sensor data. In some aspects, these algorithms include: low-pass and high-pass filters that remove frequency components outside the range of interest for specific fault types. For instance, a low-pass filter might be applied to vibration data to focus on low-frequency structural issues, while a high-pass filter could be used to isolate high frequency bearing faults.

Another filter type is a Kalman filter for real-time noise reduction and state estimation, which is particularly useful for sensors with known noise characteristics or when dealing with dynamic systems. Another filter is a Median filter that removes impulse noise or outliers that could otherwise skew the analysis, especially effective for temperature and pressure sensor data.

Another filter is a Wavelet denoising technique, which can effectively separate signal from noise across different frequency bands, preserving important transient features that might be indicative of equipment faults. Adaptive filters can adjust their parameters based on the changing characteristics of the input signal, making them particularly useful for handling non-stationary noise in industrial environments. Principal Component Analysis (PCA) can be used for dimensionality reduction, helping to identify the most significant features in multi-sensor data and filter out less relevant information. Independent component analysis (ICA) can be used to separate mixed signals from multiple sensors, which is useful in isolating specific fault signatures from complex, overlapping sensor outputs. The embodiments can dynamically select and apply these filtering algorithms based on the specific sensor type, the nature of the data being collected, and the current operating conditions of the equipment.

This adaptive approach ensures that the most appropriate filtering technique is used for each data stream. Doing so maximizes the signal-to-noise ratio and enhances the system's ability to detect subtle changes that may indicate impending equipment failure.

Returning to FIG. 1, as mentioned earlier, the non-standardized data 135A includes first sensor data obtained from one or more sensors associated with the first asset and second sensor data obtained from one or more sensors associated with the second asset. The sensor data 135D and the sensor data 435 are representative.

Service 105, and in particular the LLM agent 120, is then tasked with converting the first format of the first asset metadata, which is included in the non-standardized data, into a standardized format, resulting in generation of first standardized data. The first standardized data is included in a first hierarchically organized standardized data structure (e.g., included in standardized data structures 140A) comprising a plurality of defined standardized categories 140B into which various portions of the first standardized data are categorized.

With respect to FIGS. 1, 2A, 3A, and 3C, service 105 is able to apply optical character recognition (OCR) 125 to the non-standardized data structure 200. Service 105 then converts the existing format 210 of the non-standardized data structure 200 to a different, standardized data structure 215 by tokenizing the content in the non-standardized data structure 200, parsing content that has been categorized, and extracting that content and placing it into the standardized data structure 215. To do so, service 105 assigns tokens 220 to the data included in the non-standardized data structure 200. Each token can then be classified as belonging to a given category that is determined to be relevant. A "category" groups together content deemed to be similar to other content. For instance, operations that are related to maintenance procedures can be categorized as belonging to a "maintenance" category. Information identifying replacement parts can be categorized as belonging to a "parts" category.

Figure 2B:
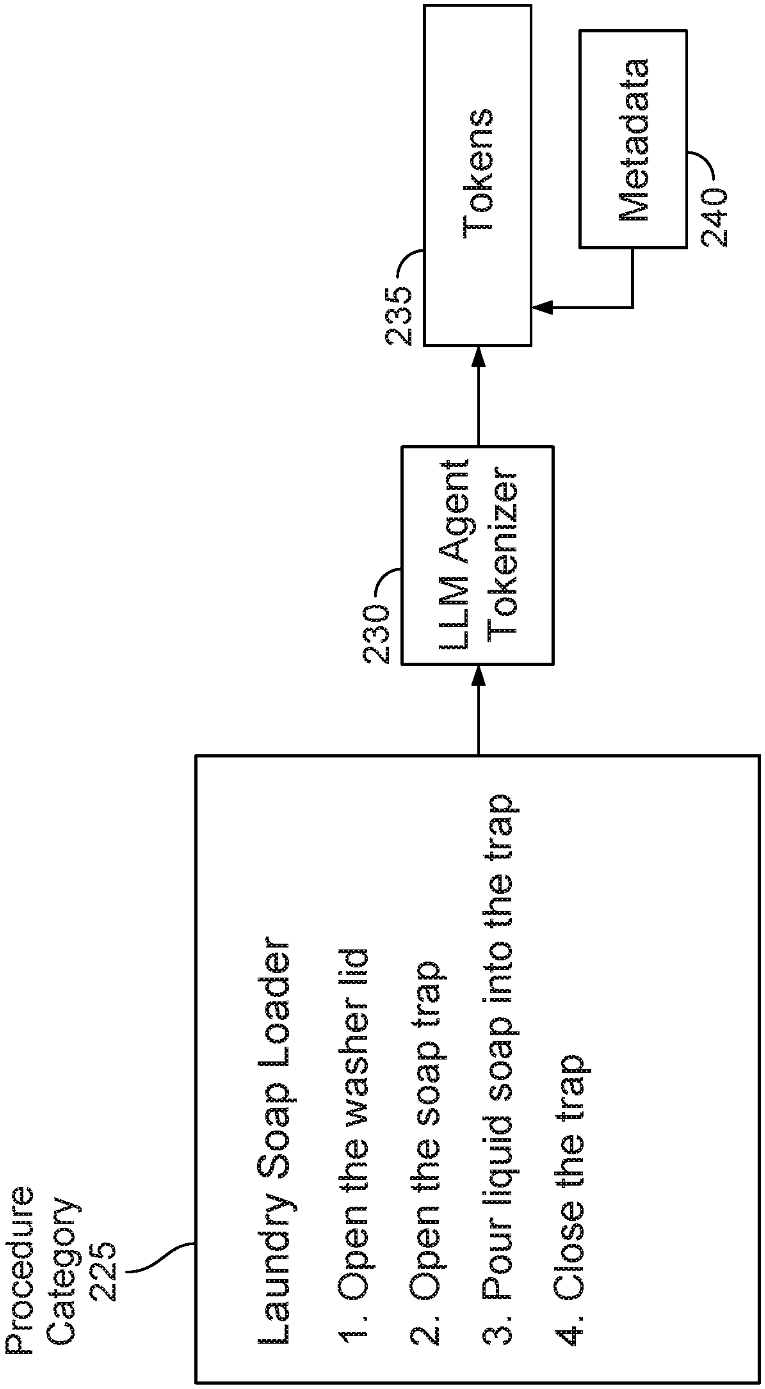

FIG. 2B shows an example tokenization process performed by the LLM agent 120. Here, a portion of a manual is identified as corresponding to a procedure (e.g., a procedure involving dispensing soap into the washer machine or a procedure involving changing the oil filter in the compressor). The LLM agent 120 reviewed the manual and performed an initial classification of the data into different categories. In this scenario, the LLM agent 120 assigned this specific portion of the manual as belonging to a procedure category 225.

The LLM agent 120 then reviews the language included in the procedure category 225 and implements an LLM agent tokenizer 230 tasked with tokenizing (e.g., further classifying) the language. The LLM agent tokenizer 230 generates a set of tokens 235 for the language, and these tokens 235 are associated with corresponding metadata 240. The metadata includes the category information (e.g., a procedure category) as well as potentially information related to what type of procedure this language is specifically directed to (e.g., dispensing soap). Of course, the metadata 240 can include any additional descriptive information as well. The tokens 235 can then be used to build a standardized data structure that includes the tokens 235. Additionally, the metadata 240 can include a link to the actual manual, where this link indicates the source or origin for a given token.

As various other examples, with reference to FIG. 2A, suppose the non-standardized data structure 200 included a parts list for the asset. The parts list can be assigned various tokens, and those tokens can include metadata fields indicating a "parts list" category. Similarly, suppose the non-standardized data structure 200 included a maintenance process and schedule. The maintenance data can be assigned various tokens, and those tokens can include metadata fields indicating a "maintenance" category. Further examples of categories will be provided later.

In FIG. 3A, service 105 also converts the second format 310 of the second asset metadata, which is also included in the non-standardized data, into the same standardized format, resulting in generation of second standardized data. The second standardized data is included in a second hierarchically organized data structure 315 that also includes the same plurality of defined categories into which various portions of the second standardized data are also categorized. Thus, for assets of similar types (e.g., washing machine type assets), similar categories can be used, even for assets made by different OEMs.

As various examples, suppose the non-standardized data structure 300 also included a parts list for the asset, but this parts list was organized and formatted differently than the parts list mentioned above with respect to FIG. 2A. Service 105 can apply tokens 320 to the various portions of the non-standardized data structure 300, and those tokens can include category metadata. Service 105 can assign the categories and the tokens during its analysis of the non-standardized data structure 300.

In some scenarios, the standardization of the data also includes modifying the language and syntax to match a specific pattern. For instance, information classified in a "procedure" category may be grammatically structured to follow a specific pattern (e.g., perhaps a gerund following by an object). It might be the case that the original language included in the OEM manual did not follow this pattern. In such a scenario, LLM agent 120 can reword the OEM language to follow the standardized grammar patterns used in the standardized data structure. Thus, some embodiments are structured to reword and grammatically reorganize language to fit a standardized language pattern followed by the data model 140. Thus, the LLM agent 120 can reword, restructure, and grammatically rearrange existing language included in an OEM document to adhere to a pattern that may be required by the data model 140.

FIG. 1 shows the resulting data model 140 that includes standardized data structures 140A associated with standardized categories 140B. The standardized data structures 140A include the newly created data structures that were mentioned above, such as data structure 215 and data structure 315. As mentioned above, these newly created data structures can have a grammatical structure that aligns or matches with a required grammatical structure of the data model 140.

Optionally, the LLM agent 120 can parse and extract out figures from the OEM documentation that are determined to be related to a given category. The LLM agent 120 can include those extracted figures in the data model 140. Stated differently, the LLM agent 120 is able to separate text content from figure content and extract (e.g., via various cropping actions) the figures from the OEM documents and include those figures in the data model 140. In the event that text surrounds the figures in the OEM document, the LLM agent 120 can identify a boundary between the figure and the text and then crop along that boundary. The boundary need not be a straight line, though it can be. Optionally, identifying the boundary can be performed by identifying blank space that exists between the figure and the surrounding text. Optionally, a buffer can be imposed around the figure to ensure that the entirety of the figure is obtained.

Relatedly, it is often the case that various instructional videos exist on the Internet, such as on YouTube, where those instructional videos can help guide individuals in performing a maintenance task. The LLM agent 120 can search out and find instructional videos that are determined to be related to a given procedure or procedure step and include a link to the instructional video in the data model 140. The link can be included in the specific line item that is determined to be related to the instructional video. Thus, the LLM agent 120 can use various key search terms, potentially obtained from the tokenized data, to facilitate an Internet search to find additional content that can be used to supplement the data model 140. Additionally, metadata, transcripts, and/or other source data associated with a video can be accessed and used to further supplement the data included in data model 140.

Figure 5:
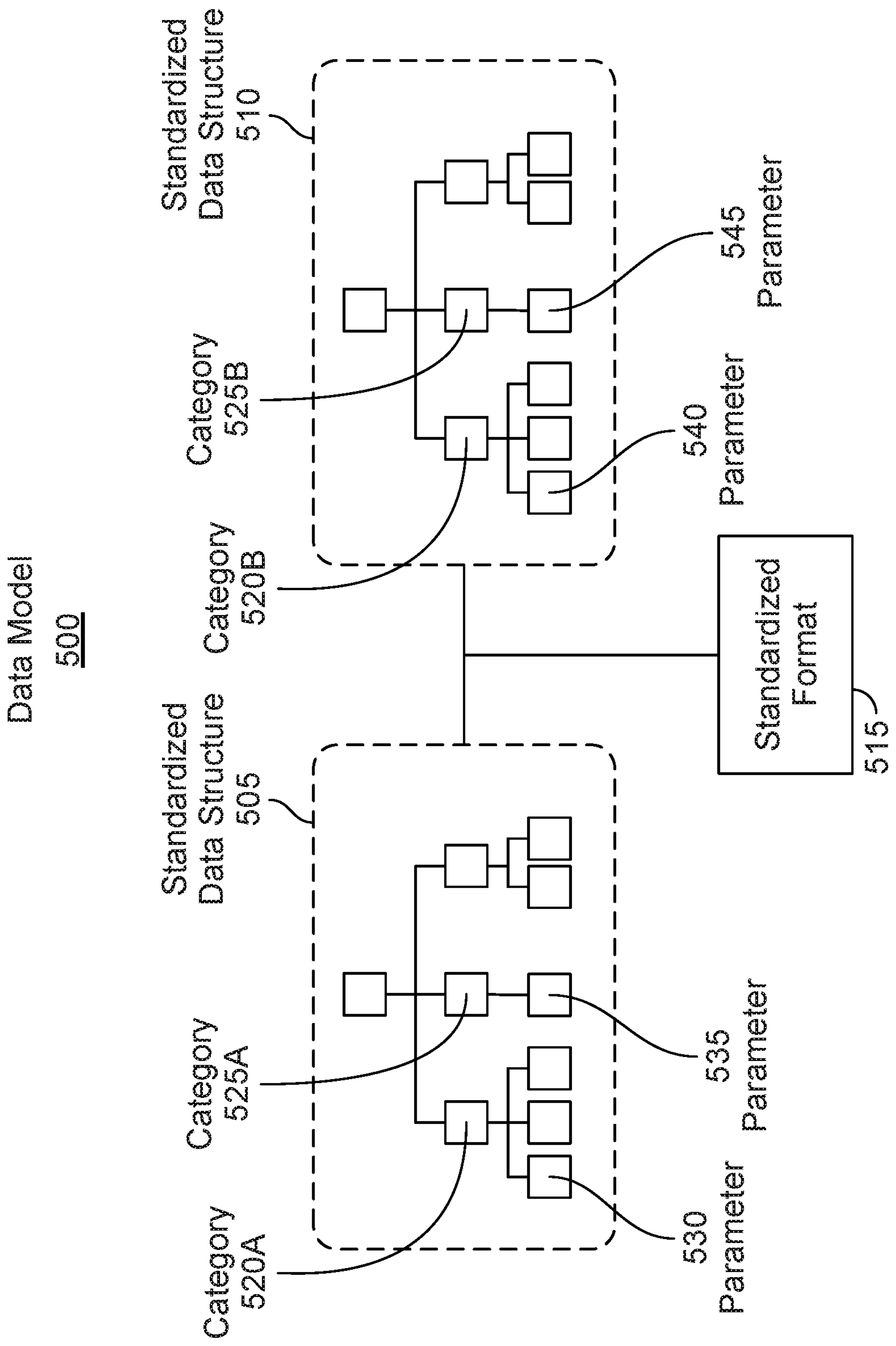
FIG. 5 illustrates an example of a standardized data model.
Figure 6:
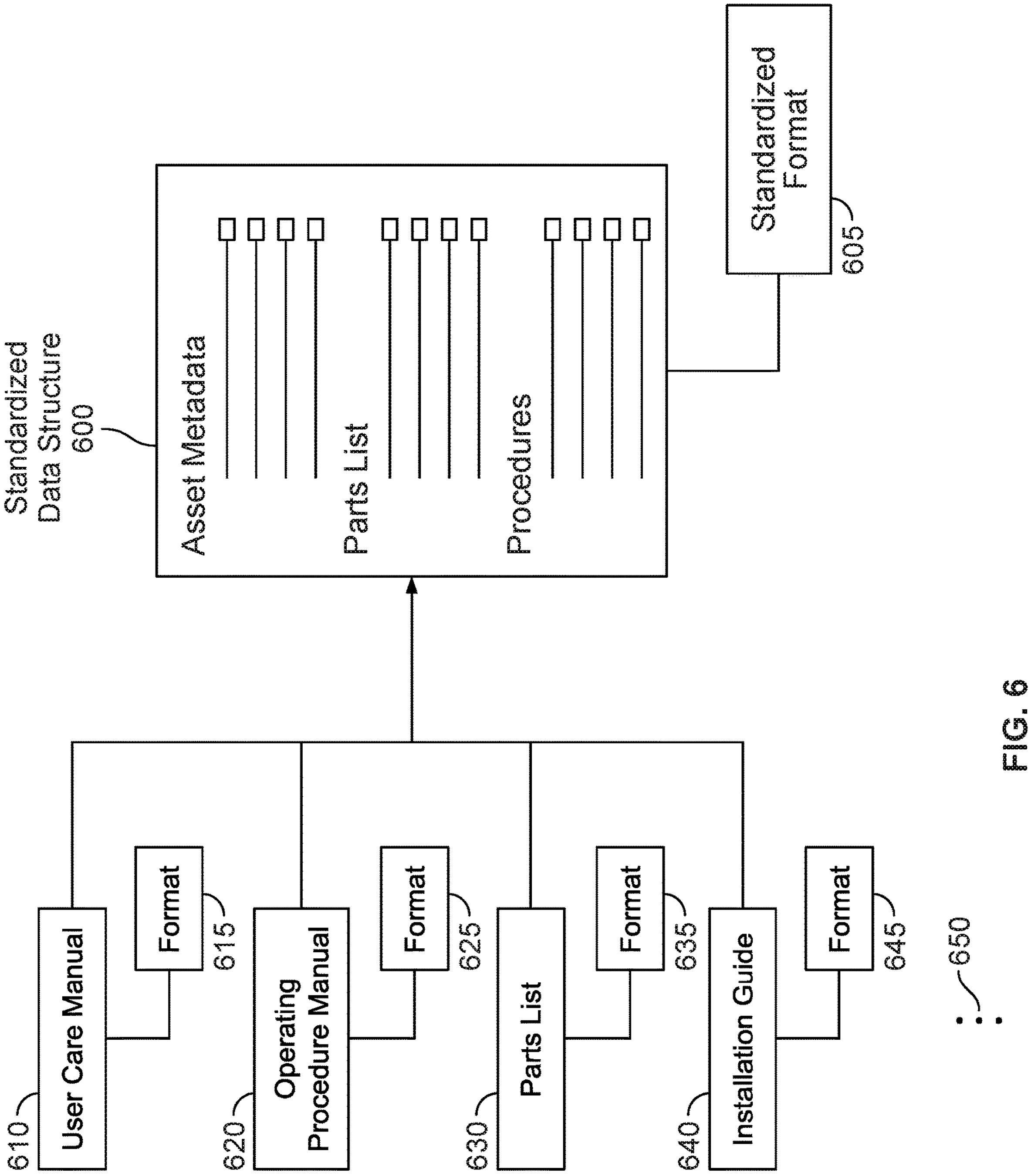
FIG. 6 illustrates how multiple sources can be used to populate the standardized data model.

Regarding the standardized categories 140B, any category type can be created. These categories can be used to categorize or group related information parsed and extracted from non-standardized data structures. Examples of the standardized categories 140B include, but certainly are not limited to, a parts list category, a maintenance category, a safety category, an asset metadata category, a procedures category, and so on, without limit. Optionally, these categories can be ones that are included in the OEM documents. As another option, these categories can be ones that the LLM agent 120 created, and they may not necessarily be recited in the OEM documents. FIGS. 5 and 6 provide some additional details regarding the data model 140.

FIG. 5 shows an example data model 500 that includes a first standardized data structure 505 and a second standardized data structure 510. Both of these data structures are formatted in accordance with a standardized format 515. In this example, each standardized data structure corresponds to a respective asset.

Standardized data structure 505 is shown as being represented by a hierarchically organized data tree that includes various different categories, including category 520A and category 525A. Similarly, standardized data structure 510 is represented by a hierarchically organized data tree that also includes various different categories, including category 520B and category 525B. Notably, category 520B corresponds to category 520A, meaning that they both represent the same category (e.g., perhaps they are both a "parts list" category). Relatedly, category 525B corresponds to category 525A. This commonality is due to the similarity between the two assets. For instance, both assets might be washing machines, so common categories can be used. A different asset type may use different categories, though in some situations, the same categories can be used even for different asset types. For instance, a maintenance category can likely be used for almost every asset. Multiple sub-categories can be nested underneath one another.

In this example, the standardized data structure 505 is generated from the non-standardized data structure 200, and the standardized data structure 510 is generated from the non-standardized data structure 300. Although the categories may be the same, or at least partially overlap, between the standardized data structure 505 and the standardized data structure 510, the values or parameters assigned to those categories will be different because the sources for those parameters are different. For instance, the parameters used to populate the standardized data structure 505 are pulled or extracted from the tokenized data in the non-standardized data structure 200, and the parameters used to populate the standardized data structure 510 are pulled or extracted from the tokenized data in the non-standardized data structure 300.

As shown, parameter 530 is assigned to the category 520A, and the parameter 535 is assigned to the category 525A. The parameters 530 and 530 are tokenized values obtained from the non-standardized data structure 200.

Parameter 540 is assigned to the category 520B, and the parameter 545 is assigned to the category 525B. The parameters 540 and 545 are tokenized values obtained from the non-standardized data structure 300.

FIG. 6 shows another example of a standardized data structure 600 that can be included in the data model 140. Again, the standardized data structure 600 is formatted in accordance with a standardized format 605.

In this example, the standardized data structure 600 is populated with data obtained from multiple different sources, or rather, multiple different domains, with each domain having potentially a different format. To illustrate, FIG. 6 shows how data from a user care manual 610 having a given format 615 can be used to populate the standardized data structure 600. Using the principles described earlier, service 105 is able to parse, tokenize, and extract data from the user care manual 610 and include it in the standardized data structure 600.

FIG. 6 shows how other sources can also be used to populate the standardized data structure 600. Initially, it is noted how the user care manual 610 is related to a particular asset. In this example, three additional sources are identified as being related to the same asset. Because of this relationship, service 105 determined that information from these other sources may be worthwhile to include in the standardized data structure 600. Thus, service 105 parses, tokenizes, and extracts data from the operating procedure manual 620, which has its own format 625, the parts list 630 manual, which has its own format 635, and the installation guide 640, which has its own format 645. The ellipsis 650 demonstrates how other sources can also be used to populate the standardized data structure 600. For instance, any type of Internet data, such as social media data or forum data, can be queried to obtain additional information for the given asset.

Figure 7:
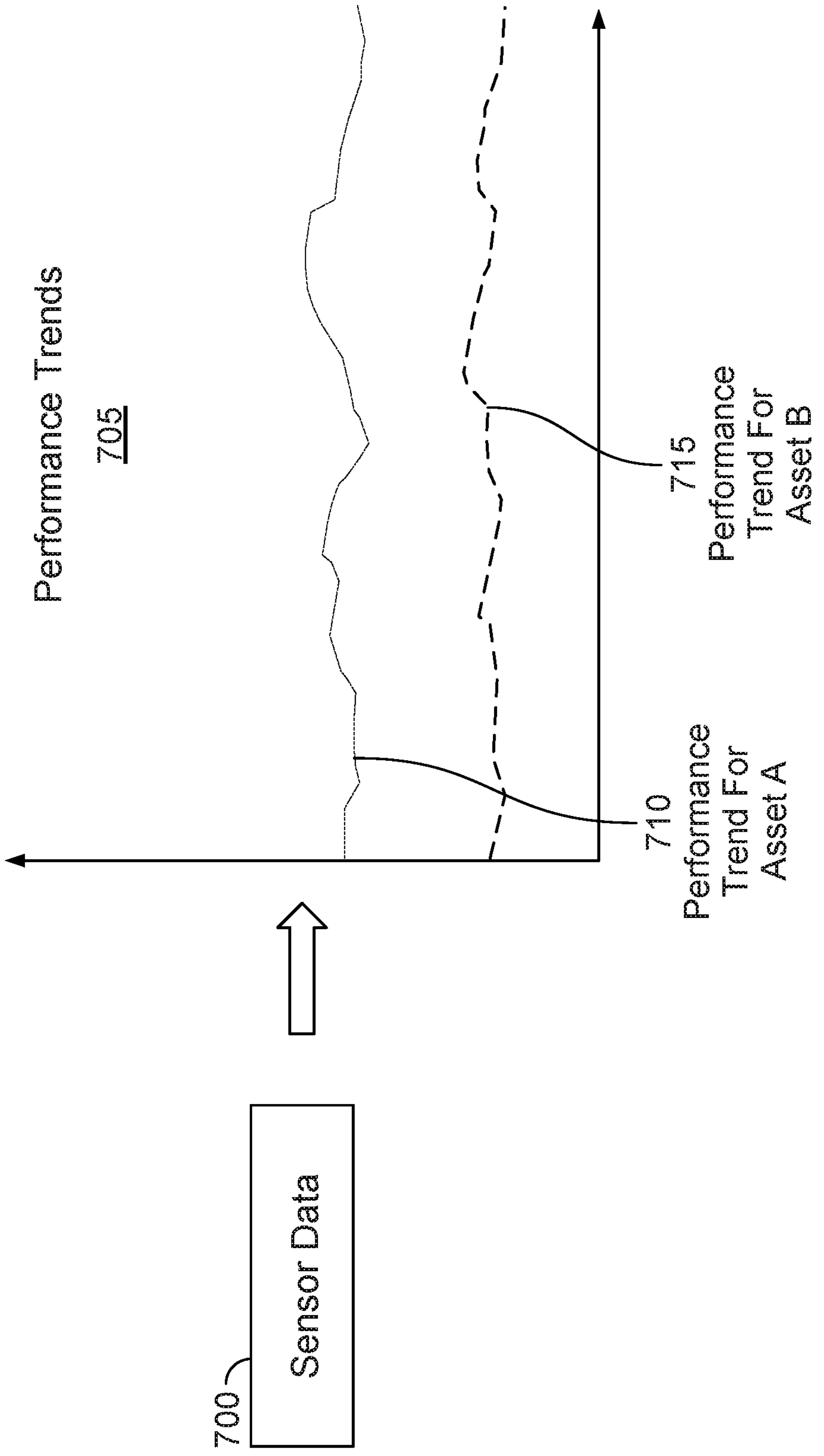
FIG. 7 illustrates the generation of various performance trends for an asset.

Returning to FIG. 1, service 105 is also tasked with generating a first performance trend for the first asset using the first sensor data and generating a second performance trend for the second asset using the second sensor data. FIG. 7 is illustrative.

FIG. 7 shows sensor data 700, which is representative of the sensor data 135D. The sensor data 700 may be collected for any duration of time. Service 105 is able to use the sensor data 700 to generate performance trends 705 for the various different assets. To illustrate, service 105 generated a performance trend for Asset A 710 and a performance trend for Asset B 715.

In FIG. 1, service 105 generates and/or further supplements the data model 140 to include the first standardized data, the second standardized data, the first performance trend, and the second performance trend. Thus, the data model 140 can include historical behavior data for a given asset. Service 105 then provides access to the data model 140 via one or more APIs 145, which include, but are not limited to, an anomaly detection 145A API, a forecasting 145B API, and an optimization 145C API. Further details on these APIs will be provided later.

Figure 8:
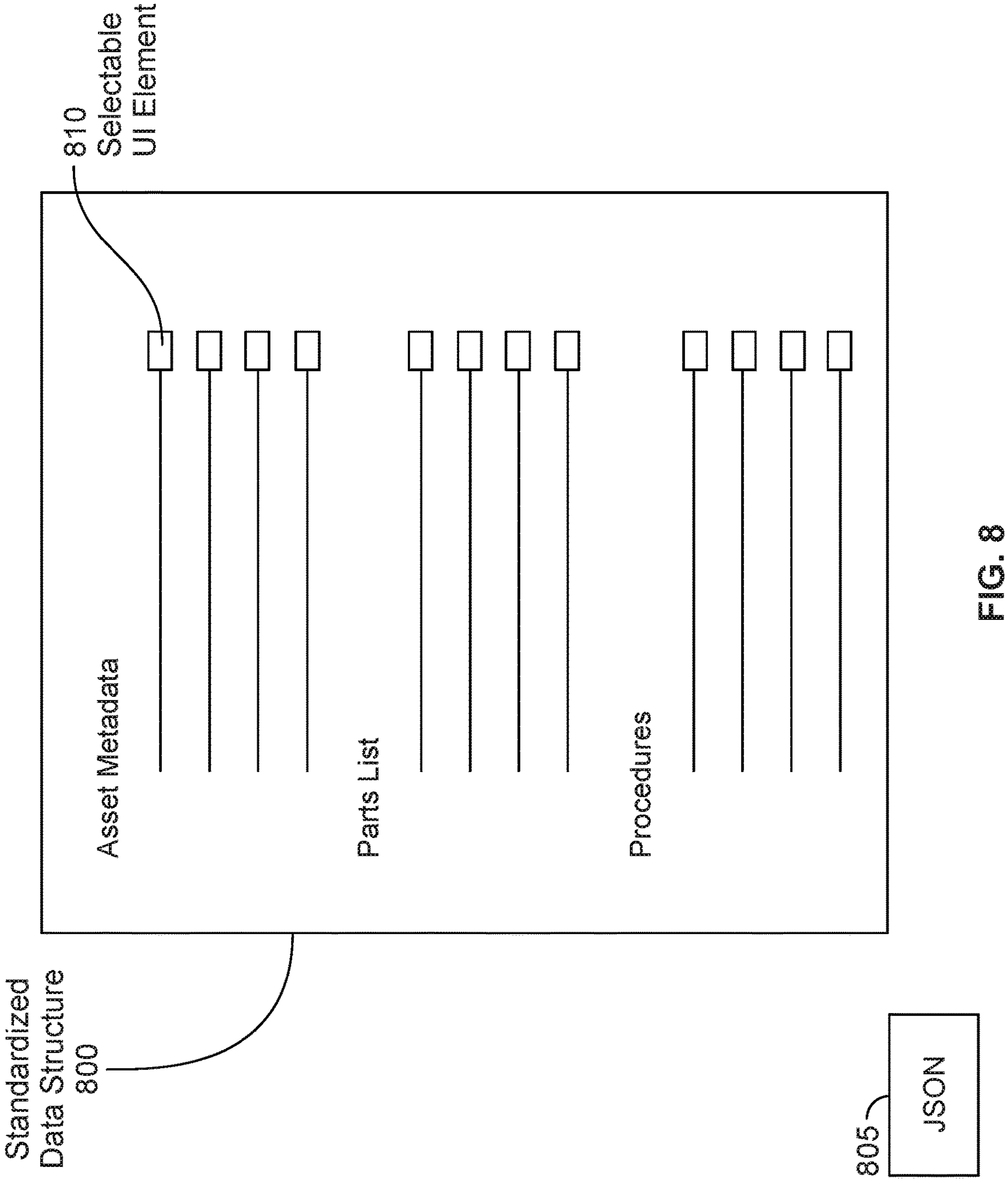
FIG. 8 illustrates an example format for a standardized data structure.

The standardized data structures included in the data model 140 can be organized in different ways. FIG. 8 shows one example way.

FIG. 8 shows an example standardized data structure 800 that can be included in the data model 140. In this example, the standardized data structure 800 is structured using a JSON 805 format. Of course, other formats can be used. As mentioned previously, they can also be structured to follow a required grammatical pattern or language pattern.

The standardized data structure 800 is shown as being organized using three different categories (e.g., asset metadata, parts list, and procedures), though other categories can be used, as well as a different number. Standardized data structure 800 is also structured to include any number of selectable user interface (UI) elements, such as selectable UI element 810.

Figure 9:
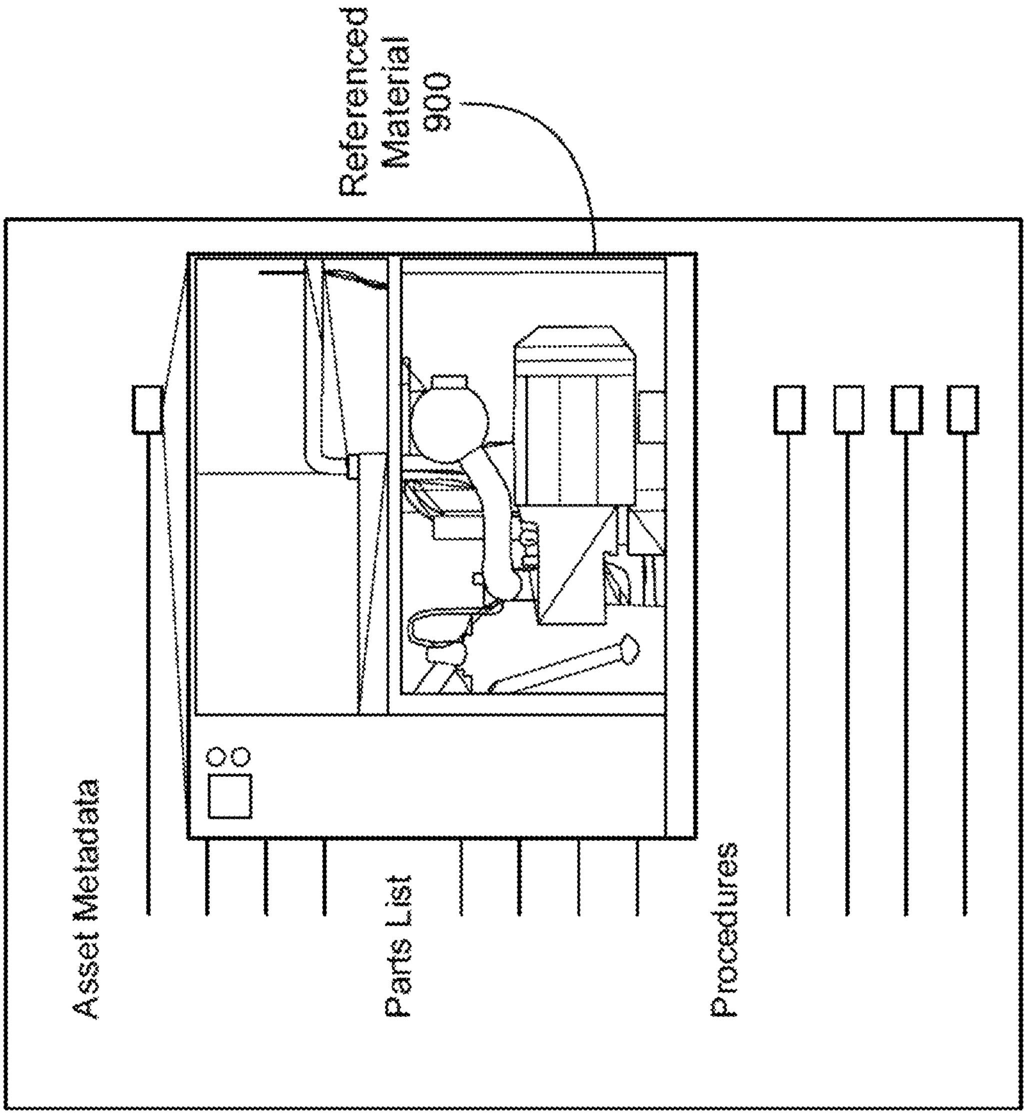
FIG. 9 illustrates another example of the standardized data structure.

In this scenario, selectable UI element 810 is associated with a specific line item under the asset metadata category. When the selectable UI element 810 is selected, the embodiments trigger the display of data obtained from the original source; that is, the embodiments display corresponding content extracted from the original non-standardized data structure (e.g., the OEM document). FIG. 9 shows one such example.

FIG. 9 shows how the embodiments can display referenced material 900 in response to the selection of a selectable UI element within the standardized data structure. In this example, the embodiments displayed the compressor information (e.g., image data and/or text data) described with respect to FIG. 3C. Service 105 determined that the line item linked to the selectable UI element 810 was also linked to the particular page that is currently being displayed as the referenced material 900. Thus, the embodiments can display the original source material for a parameter that is selected within a standardized data structure. Such a feature is particularly beneficial for users who may desire to observe the original source material having its original formatting and structure. Accordingly, the data model, including its standardized data structures, can be surfaced or displayed to users. Users are also provided the option to select various UI elements. Doing so can trigger the display of origin or source material, which may include material included in the OEM document, Internet content, forum content, social media content, and so on.

In the example where Internet content is displayed in response to the selection of the selectable UI element, some embodiments trigger the display of a web browser. These embodiments also navigate to the URL that is the source or origin for the information. Thus, the LLM agent 120 can facilitate the execution of a third-party application (e.g., a web browser) and can further facilitate specific actions and navigations within that third-party application.

Optionally, the referenced material 900 is displayed simultaneously with the selectable UI element and with the corresponding line item. That is, the referenced material 900, at least in some circumstances, is displayed in a manner so as to not obfuscate the corresponding selectable UI element and the corresponding line item; instead, other portions of the standardized data structure may be obfuscated. In other scenarios, however, the corresponding line item and selectable UI element may be obfuscated by the display of the referenced material 900. In some scenarios, it may be beneficial to modify the visual application of the referenced material 900, such as perhaps by making it partially transparent so that the content displayed underneath the referenced material 900 can at least be partially visible through the referenced material 900.

Figure 10:
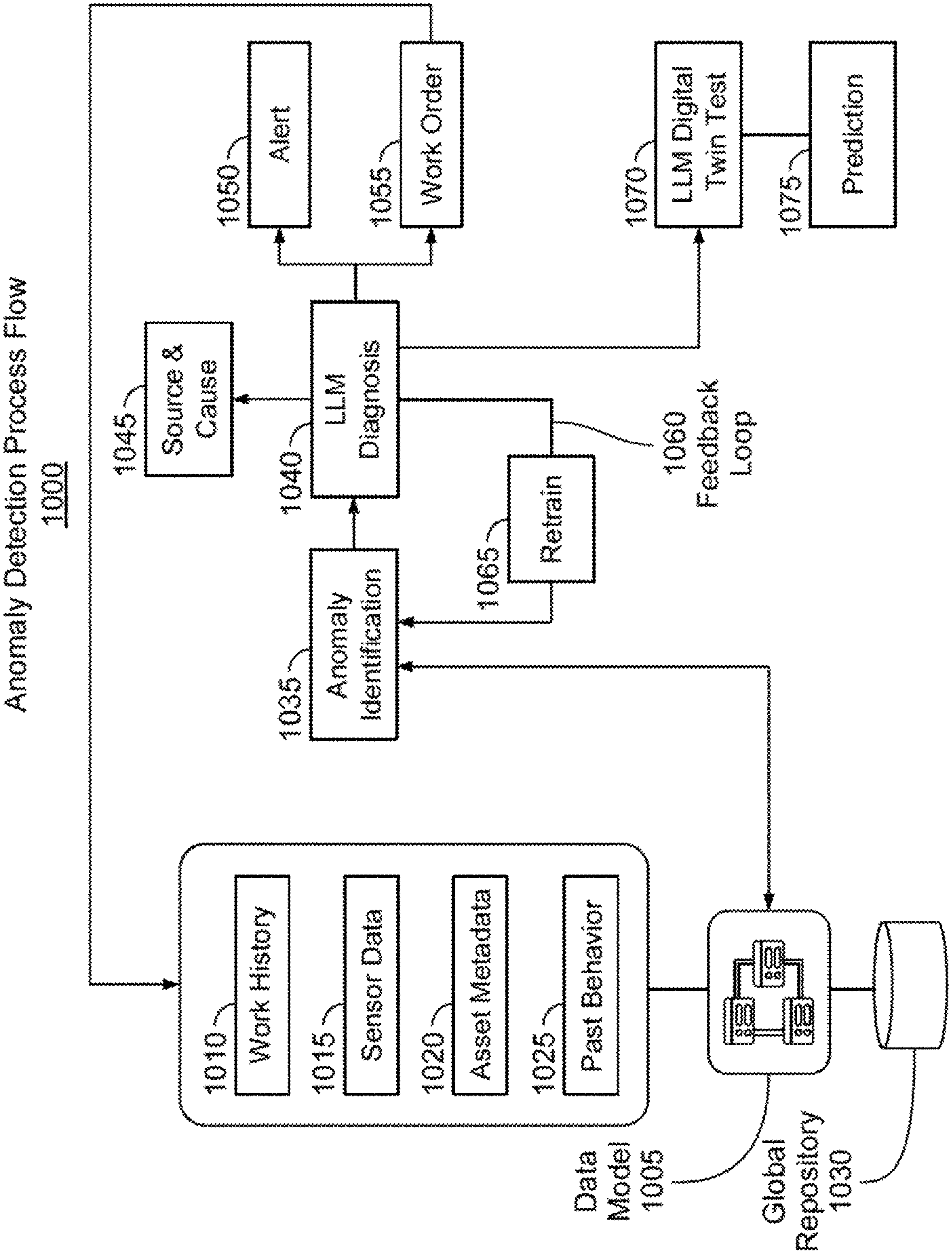
FIG. 10 illustrates an anomaly detection process flow.

Attention will now be directed to FIG. 10, which illustrates an example anomaly detection process flow 1000 that can be performed by service 105 (and the LLM agent 120) using the data model 140 and using the anomaly detection 145A API.

Service 105, via the anomaly detection 145A API, is able to access a data model 1005, which is representative of the data model 140 from FIG. 1. Here, the data model 1005 includes numerous different types of data, including, but not limited to, work history 1010 data for a given asset, sensor data 1015 for the asset, asset metadata 1020 for the asset, and past behavior 1025 for the asset. The data model 1005 can be considered as a type of global repository 1030 that may be globally available to different APIs, including the anomaly detection 145A API. Optionally, information obtained from different tenants or customers can be used to populate the data model 1005 so as to provide a truly global repository of information.

Using the information included in the data model 1005, the LLM agent 120, via the anomaly detection 145A API, is able to identify a deviation in the asset's behavior, where this deviation is referred to as an "anomaly," as shown by anomaly identification 1035. The LLM agent 120 can then be triggered to diagnose the anomaly, as shown by LLM diagnosis 1040. By "diagnose," it is generally meant that the LLM agent 120 is tasked with attempting to identify a source and a cause 1045 for the anomaly.

The LLM agent 120 can identify the possible root causes of detected faults/anomalies. The LLM agent 120 identifies the possible root causes of detected faults by analyzing the correlation between the observed data anomalies and the known failure modes of the equipment. In some aspects, the LLM agent 120 may employ diagnostic algorithms that compare the detected patterns of wear and tear against a database of fault signatures, which are characteristic indicators of specific types of failures. The LLM agent 120 may also take into account the operational context of the equipment, such as load conditions, operating cycles, and maintenance history, to provide a more accurate diagnosis. By integrating this multi-dimensional analysis, the LLM agent 120 can pinpoint the underlying issues that are likely to lead to equipment failure, such as misalignment, lubrication degradation, or thermal stress, among others. This enables maintenance personnel to target their efforts more effectively and implement corrective actions that address the root cause of the problem, rather than just the symptoms.

After identifying the source and the cause 1045, the LLM agent 120 can then generate an alert 1050 to a responsible party and can generate a work order 1055 that includes instructions on how to potentially resolve the anomaly. If the performance of the work order 1055 results in a successful resolution of the anomaly, then the LLM agent 120 can be notified. This notification can result in fine tuning or further training the LLM agent 120. If no successful resolution is found, then a new attempt can be made by the LLM agent 120. This iterative process can be repeated until a successful resolution is found. Thus, the embodiments can employ a feedback loop 1060 for successful and not-yet successful attempts, and the LLM agent 120 in particular can then be retrained 1065 to adopt successful attempts or to try new operations. Information indicating both success and failure can be included in the data model 1005 to assist in avoiding redundant and repetitive potential solutions.

The LLM agent 120 can make predictions and recommendations to prevent failures before they occur. The LLM agent 120 makes predictions and recommendations to prevent failures before they occur by employing prognostic algorithms that analyze the current state of the equipment and its historical performance data. In some aspects, the LLM agent 120 may use machine learning techniques to build predictive models that estimate the remaining useful life of equipment components and systems. These models take into account the trends and patterns of wear and tear, as well as the operational conditions under which the equipment is used.

Some embodiments also employ the use of a digital twin. As used herein, a "digital twin" is a simulated representation of a hardware asset. The digital twin is configured to operate in the same manner as the hardware asset, but in a simulated manner. Optionally, prior to generating the alert 1050 and the work order 1055, the LLM agent 120 can test the proposed resolution using the digital twin, as shown by LLM digital twin test 1070. Based on this test, the LLM agent 120 can make a better prediction 1075 as to whether the proposed resolution will or will not be successful. Any number of testing iterations can be performed using any number of alternative proposed solutions. This testing might involve modification of configuration parameters, asset state, and potentially environmental conditions. All these modifications can be simulated and tested using the digital twin and the LLM agent 120.

When solutions are found to a given anomaly, the data model 1005 can be updated to include these solutions for the anomalies. Thus, iterative and continuous learning and improvement can be achieved via the disclosed embodiments.

Thus, the LLM agent 120 is able to detect one or more anomalies for an asset. Optionally, these anomalies can be detected via the use of a trained artificial neural network (ANN) that is trained to detect anomalies in an asset's behavior. When an anomaly is detected, the LLM agent 120 can determine a source for the anomaly. The LLM agent 120 can then attempt to block, impede, or otherwise interact with the source in an attempt to eliminate the anomalous behavior. As one example, if the anomaly is determined to arise due to a change in an environmental condition, the LLM agent 120 can communicate with an Internet of Things (IoT) climate control device to modify the climate in which the asset is operating. The LLM agent 120 can instruct the IoT climate control device to change one or more conditions in an attempt to eliminate the anomalous behavior for the asset. Stated differently, in some scenarios, the service/LLM agent 120 communicates with an IoT device that controls a condition associated with an asset, and controlling the condition associated with that asset results in a modification to a performance of the asset. The LLM agent 120 can also communicate with a PLC to control various aspects or features of the asset in an attempt to remove the anomaly.

As used herein, the phrase IoT generally refers to one or more networked physical devices that are embedded with controls, sensors, software, and network connectivity. These IoT devices communicate over the Internet. The IoT devices can be used to collect information from assets and other physical world conditions and transmit that information to an end destination. In some scenarios, the IoT devices include logic structured to enable control of an asset, such as a climate control device. Instructions can be sent to the IoT device to control the asset. Thus, remote control, monitoring, and automation can be implemented via the use of IoT devices.

Figure 11:
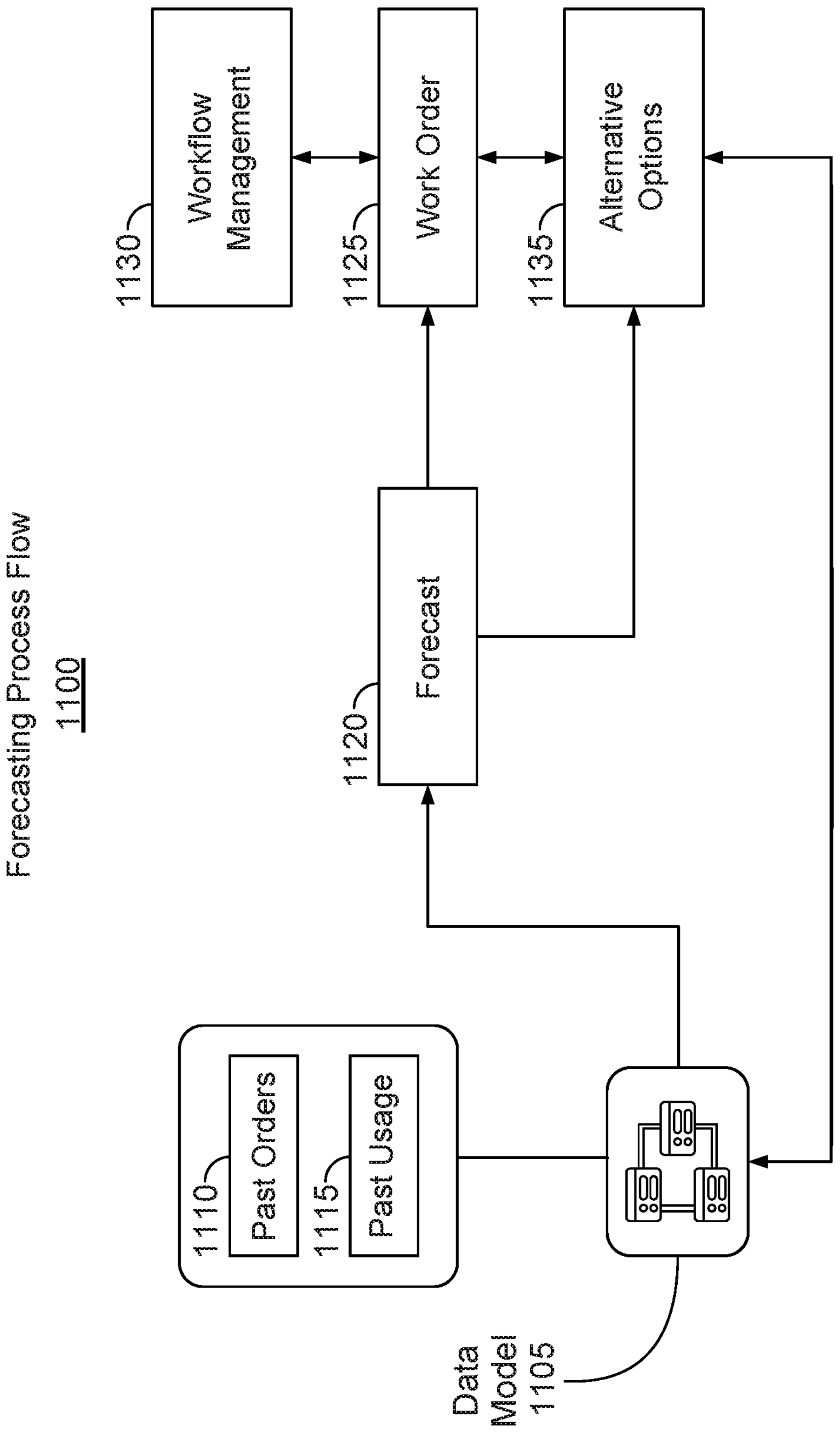
FIG. 11 illustrates a forecasting process flow.

Attention will now be directed to FIG. 11, which illustrates an example forecasting process flow 1100 that can be performed using the forecasting 145B API and the LLM agent 120. Initially, the data model 1105, which corresponds to the data model 140, is accessed by the LLM agent 120 via the forecasting 145B API. Here, the data model 1105 includes past orders 1110 (e.g., previous work orders) for a given asset as well as past usage 1115 metrics for the asset. Using the data model 1105, the LLM agent 120 to generate a forecast 1120 regarding a future state for the asset. For instance, the forecast 1120 can include a determination that a certain part will likely fail by a given predicted date and that the part should be replaced prior to that date. The forecast 1120 can include a determination that certain inventory may be depleted by a given predicted date, and additional inventory should be ordered prior to the depletion date. The forecast 1120 can include any prediction regarding the asset.

The LLM agent 120 can trigger the generation of a work order 1125 based on the given forecast 1120. The LLM agent 120 can include the work order 1125 in project management, thereby allowing for the asset's workflow management 1130 to be properly managed.

The LLM agent 120 can also identify one or more alternative options 1135 with respect to a given part or inventory item that is to be replaced or replenished. For instance, during the time of manufacture, assets are typically equipped with OEM parts. Non-OEM parts might be made for the asset, and it might be the case that the non-OEM parts are cheaper or perhaps even more durable than the OEM parts. The LLM agent 120 can determine that these non-OEM parts or inventory are viable alternative options 1135 for the OEM parts or inventory. The alternative options 1135 can be included in the data model 1105.

In this manner, the LLM agent 120, via the forecasting 145B API, can implement a parts classifier that identifies parts usage across any number of organizations, parts information from documentation, and labelled parts data to classify/cluster into parts groups. The LLM agent 120 is able to define parts that are similar/cross-functional. The LLM agent 120 can recommend parts based on parts usage within an organization. The LLM agent 120 beneficially provides options for replacement parts that fit asset usage and maintenance schedule.

The LLM agent 120 can use documentation information extracted from manuals and history of parts usage from an organization to predict actionable next steps within the system (e.g., purchase order for predicted parts amount, potential assignment of purchase order, maintenance work order, etc.). The LLM agent 120 can use sensor data triggers as well as maintenance and work order histories in order to proactively create work and purchase orders.

In some scenarios, the LLM agent 120 can manage various inventory records for an asset by tracking the location of items of inventory in a warehouse for the asset. Optionally, different camera systems (e.g., high resolution cameras) can be used, including an array of multiple cameras. Each camera may be positioned at a pre-determined location in the warehouse. Optionally, some of the fields of view of the cameras can at least partially overlap. These cameras are able to obtain image sequences of each item of inventory in the warehouse.

The LLM agent 120 can optionally create an inventory record for the items in inventory. This inventory record can optionally include the acquired image sequence from the camera array. The LLM agent 120 can add classification data to the image, where the classification data may specifically state a given image reflects a specific type of inventory. Optionally, image analysis can be performed on the image to determine quantity of the inventory, as represented in the image. Location data can also be added to the image. Optionally, three-dimensional (3D) coordinates for the inventory can also be reconstructed. For instance, it might be the case that the inventory is on the fifth shelf, so the 3D coordinates can include height data as well as X-Y data relative to the floor. The LLM agent 120 can automatically update the inventory record to include the 3D coordinates for the inventory. Stated differently, the LLM agent 120 can automatically update the inventory record to include the physical location of the item within the warehouse. This information can be used during the forecasting operations.

Figure 12:
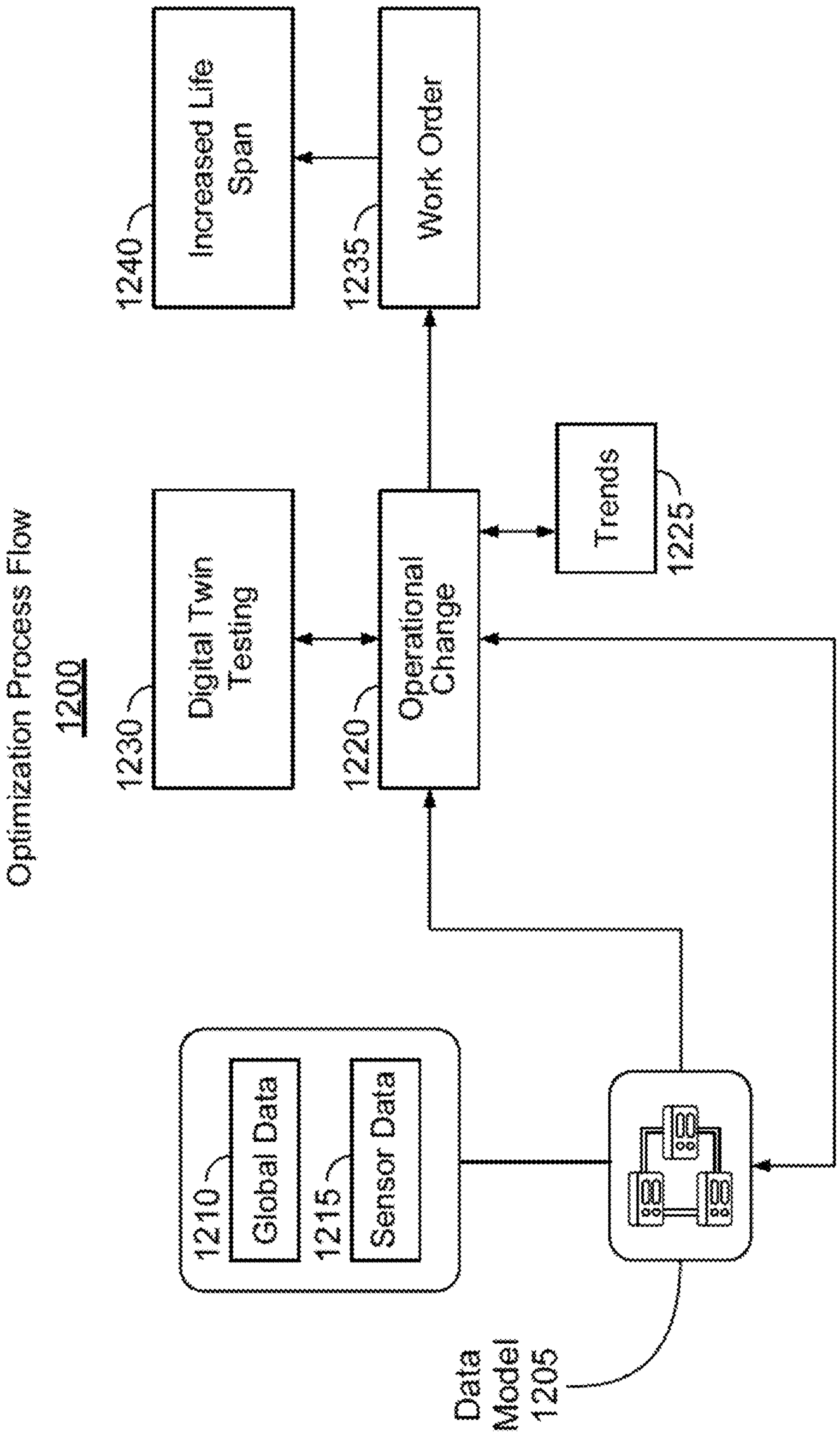
FIG. 12 illustrates an optimization process flow.

Attention will now be directed to FIG. 12, which illustrates an optimization process flow 1200 that can be performed by the LLM agent 120 via the optimization 145C API. Initially, the data model 1205, which corresponds to the data model 140, is accessed by the LLM agent 120 via the optimization 145C API. The data model 1205 is shown as including global data 1210 and sensor data 1215 for a given asset. The global data 1210 includes data from other clients for the same make and model of the asset currently being analyzed by the LLM agent 120. The sensor data 1215 is sensor data for the asset currently being analyzed.

The LLM agent 120 is able to use the data model 1205 to generate an operational change 1220 that, if employed, may result in an increased life span of the given asset and/or may result in improved performance of the asset without sacrificing lifespan. Specifically, the LLM agent 120 is able to identify behavioral trends 1225 for the asset based on the instant asset's own data as well as other data obtained from other instances of that asset.

After generating the operational change 1220, the LLM agent 120 can facilitate digital twin testing 1230 by testing the operational change 1220 using the asset's digital twin. The digital twin testing 1230 may result in an indication that the proposed operational change 1220 is a viable option for prolonging the asset's lifespan and/or for increasing an efficiency or output of the asset without sacrificing the asset's lifespan. Optionally, in some scenarios, the LLM agent 120 is implemented or can operate as the digital twin. Stated differently, the LLM agent 120 can be configured as the digital twin disclosed herein. Thus, in some scenarios, the LLM agent 120 and the digital twin are separate entities while in other scenarios, the LLM agent 120 and the digital twin are the same entity. To illustrate, an asset-specific LLM-based system can operate as a digital twin if the LLM system is continuously updated with sensor data and maintains live access to asset status and recent work history (as well as integrating with predictive models and other tools).

By continuously updating the disclosed data models with new data, the LLM agent 120 can provide dynamic predictions that reflect the current health of the equipment. It should be noted how the updating process can include continuous updating techniques, such as continuous learning, fine-tuning, and/or reinforcement learning techniques. When the LLM agent 120 anticipates a potential failure, it generates recommendations for maintenance actions that can be taken to mitigate the risk. These recommendations may include specific repairs, adjustments, or replacements that are likely to prevent the failure from occurring. The LLM agent 120 may also suggest changes to the operational parameters of the equipment to reduce stress and wear, thereby extending its lifespan. Additionally, the LLM agent 120 can schedule these maintenance activities at times that minimize disruption to the production process, further enhancing the efficiency and reliability of the industrial operation.

As an example, it may be the case that the user manual indicates that that asset should not operate beyond a threshold level of performance or the asset may be harmed. In practice, however, it may be found that the threshold level is overly conservative and no actual harm occurs if the asset performs beyond that threshold. Thus, the asset can actually operate at a higher level of performance than the one indicated in the user manual. This determination can be made based on performance data acquired from the instant asset as well as other client's assets of the same type. Technicians may provide feedback data to indicate the potential for increased output without loss of lifespan. Any type of feedback can be employed and can be provided to the LLM agent 120 and the data model 140.

After generating the operational change 1220 and potentially after performing the digital twin testing 1230 to validate the operational change 1220, the LLM agent 120 can generate a work order 1235 that, when implemented, modifies the performance of the asset. This modification is designed to increase the life span of the asset, as shown by increased life span 1240, and/or increase the output or efficiency of the asset without compromising the lifespan at all or beyond an acceptable threshold level of compromise. The modification may result in changes to configuration parameters of the asset, scheduling of the asset, uptime and downtime changes for the asset, power up and power down events for the asset, and so on.

As one example, actual usage data might indicate that an asset performs better if it is now power cycled on and off; instead, the asset operates better when the asset is allowed to stay powered on indefinitely. The user manual, on the other hand, may state otherwise. The LLM agent 120 can use this actual performance data to suggest a modification in the asset's behavior, where that modification actually results in an improvement to the performance of the asset even though the modification is contrary to the OEM recommendation.

In another scenario, the LLM agent 120 can communicate directly with the asset and/or with a PLC that controls the asset. Via this communication interface, the LLM agent 120 can modify the performance of the asset in accordance with the projected modification that is designed to optimize the asset, such as by extending its lifespan or by increasing its efficiency without significantly (e.g., exceeding a threshold amount) impairing its lifespan. Thus, actual performance changes to the asset can be implemented by the LLM agent 120.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13A:
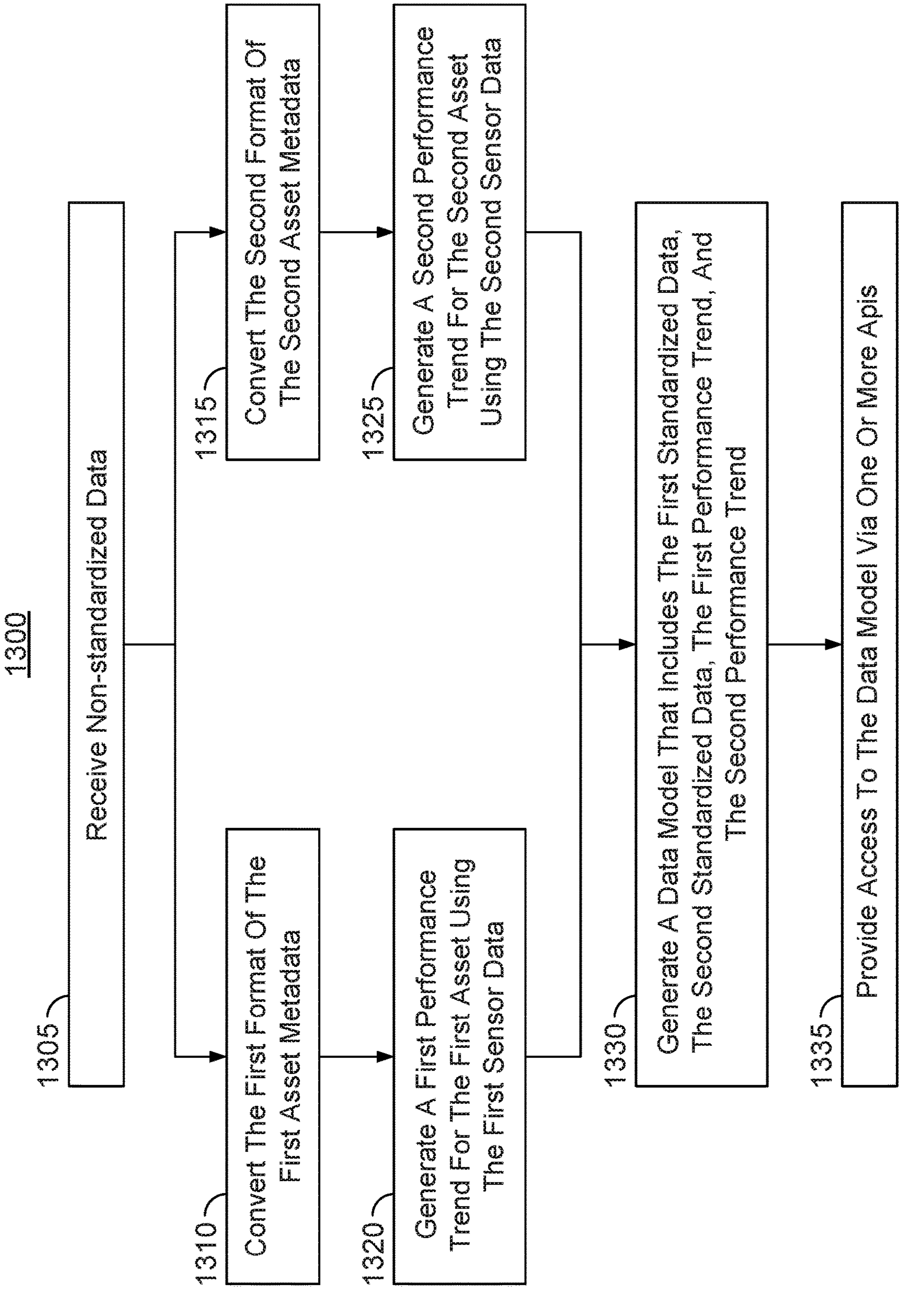
FIGS. 13A and 13B illustrate a flowchart of an example method for generating standardized data from non-standardized data.
Figure 13B:
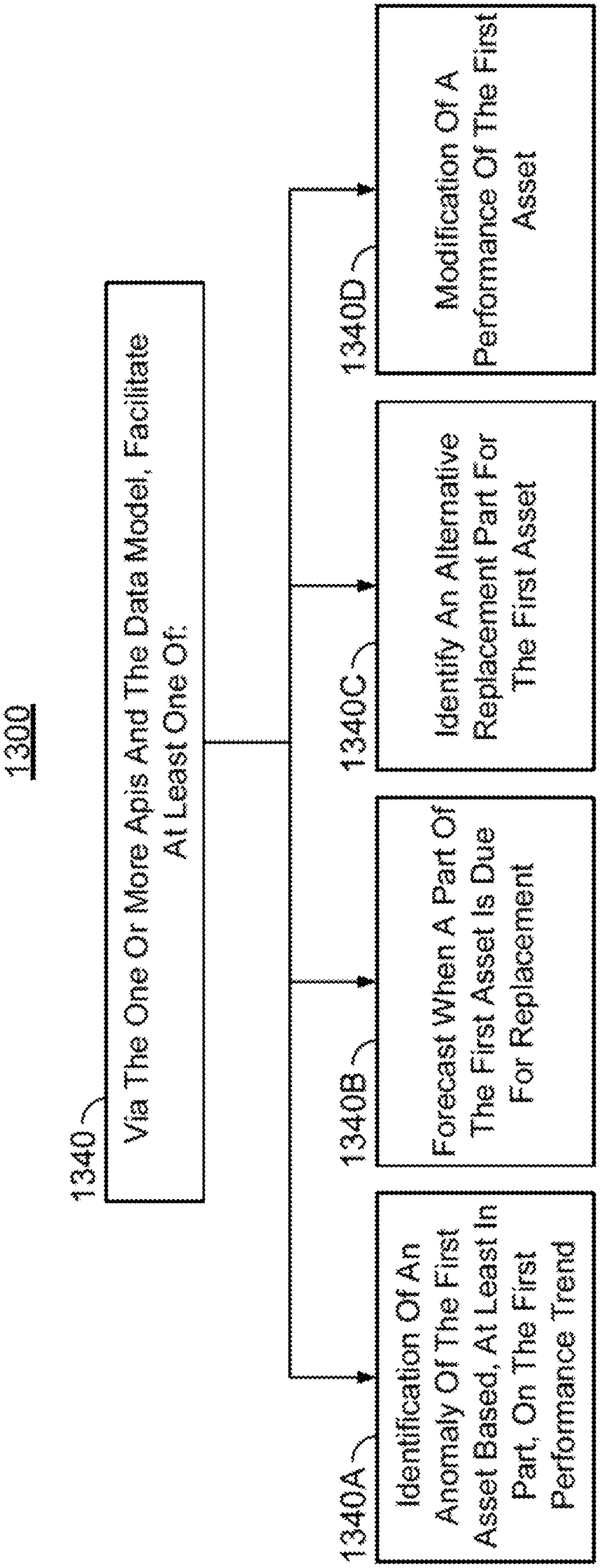

Attention will now be directed to FIGS. 13A and 13B, which illustrate a flowchart of an example method 1300 for standardizing asset metadata and for facilitating access to the resulting standardized data via one or more application programming interfaces (APIs). Method 1300 is implemented within the architecture 100 of FIG. 1 and by the service 105, which, as discussed earlier, may include the LLM agent 120. That is, the service can include an LLM agent and/or a generative pre-trained transformer (GPT).

Method 1300 includes an act (act 1305) of receiving non-standardized data. This non-standardized data comprises data that includes first asset metadata describing a first asset and second asset metadata describing a second asset. The first asset metadata is obtained from a first domain and has a first format. The second asset metadata is obtained from a second domain and has a second, different format. The non-standardized data further comprises data that includes first sensor data obtained from one or more sensors associated with the first asset and second sensor data obtained from one or more sensors associated with the second asset.

In some scenarios, the first domain is one of a user manual domain, a procedure manual domain, or a parts inventory manual domain. In one scenario, the first asset is an industrial machine included in a factory environment, and the second asset can be a different industrial machine. Other machines and asset types can be involved as well, however. One will appreciate how the above domains are provided for example purposes only, and other domains can be involved. For instance, other domains include, but are not limited to, work orders, safety and compliance content, tribal/workforce knowledge that is not formally documented, and even scheduling-related data.

Optionally, the embodiments can execute optical character recognition (OCR) on the first asset metadata and/or the second asset metadata. Tokens can then be assigned to the data to help characterize and categorize the data.

Act 1310 includes converting the first format of the first asset metadata, which is included in the non-standardized data, into a standardized format, resulting in generation of first standardized data. The first standardized data is included in a first hierarchically organized data structure comprising a plurality of defined categories into which various portions of the first standardized data are categorized.

Act 1315 includes converting the second format of the second asset metadata, which is also included in the non-standardized data, into the same standardized format, resulting in generation of second standardized data. The second standardized data is included in a second hierarchically organized data structure that also includes the same plurality of defined categories into which various portions of the second standardized data are also categorized.

The process of converting the first (or second) format of the first (or second) asset metadata to the standardized format can include executing optical character recognition (OCR) on the first asset metadata, resulting in generation of a set of tokens for the first asset metadata. The process can further include causing a large language model (LLM) agent to classify at least some of the set of tokens into at least some of the categories included in the plurality of defined categories, such that the LLM agent generates classified tokens. The process can further include generating a plurality of different groups of classified tokens by grouping together specific classified tokens that are identified as belonging to a common category. The process then includes inserting the plurality of different groups of classified tokens into the first hierarchically organized data structure. This insertion includes organizing the plurality of different groups of classified tokens according to their respective categories.

Optionally, one, some, or all of the categories can be pulled from the OEM document. As another option, one, some, or all of the categories can be generated by the LLM agent 120. As yet another option, one or more categories can be pulled from the OEM document, and one or more categories can be generated by the LLM agent 120.

Act 1320 includes generating a first performance trend for the first asset using the first sensor data. Act 1325 includes generating a second performance trend for the second asset using the second sensor data. These performance trends can be computed based on current sensor data as well as previously acquired sensor data. Often, the sensor data is localized data that reflects the behavior of the instant asset. In some scenarios, it may be worthwhile to collect sensor data for the same make/model of asset, but that asset is positioned at a different location and/or is owned by a different client. The embodiments are able to collect any amount of sensor data for the same make/model of asset but from different locations. Using this data, a behavioral model for the asset can be created. Current behavior of the instant asset can then be compared against the model to identify faults, anomalies, or any type of behavior deviation.

Act 1330 includes generating, accessing, augmenting, and/or otherwise supplementing a data model that includes the first standardized data, the second standardized data, the first performance trend, and the second performance trend. The data model can be structured in such a manner so as to impose rules as to how data included therein is to be formatted and rules as to the modification, addition, or elimination of data therefrom.

Act 1335 includes providing access to the data model via one or more APIs. In some implementations, the one or more APIs includes an anomaly detection API, a forecasting API, and/or an optimization API. Optionally, authentication and authorization can be required in order to access the data model.

The LLM agent, via the anomaly API, is tasked with identifying a cause for a detected anomaly associated with the first asset, and the LLM agent, via the anomaly API, identifies the detected anomaly based, at least in part, on the first performance trend. The forecasting API assists the LLM agent with forecasting when a part for the first asset is due for replacement. The forecasting API can also assist the LLM agent in identifying an alternative replacement part for the first asset, where the alternative replacement part is an alternative for an original equipment manufacturer (OEM) part for the first asset. The LLM agent, via the optimization API, is tasked with facilitating modification of a performance of the first asset, where the modification of the performance is based on a determination that the modification will result in a prolonging of a lifespan of the first asset. Optionally, the modification is tested using a digital twin for the first asset. As another option, the modification is a deviation from a recommended operational state of the first asset.

Beneficially, the disclosed embodiments allow for the detection (and thus the prevention) of industrial equipment failure before it occurs. By tapping into operational data of industrial equipment, such as information from the programmable logic controller (PLC) that operates it and physical/analog data of its operation (e.g., vibration and rotation signals, frequencies, amplitude, phase, etc.) including noise, temperature, airflow, current, voltage, etc. Some of the faults that can be detected include, but are not limited to: bearing and gear issues (erosion, wear, eccentricity), belt and pulley wear, rotor and stator problems (loose bars, windings, eccentricity), electrical faults (current spikes, phase imbalances, overload), mechanical issues (misalignment, looseness, resonance), fluid-related problems (cavitation, turbulence, pump recirculation), structural concerns (pipe deformation, excessive vibrations), and operational anomalies (lubrication faults, excessive power consumption).

By capturing as much data as possible around the operation of the equipment, over time it is possible to detect trends and patterns of wear and tear on different subsystems and parts of the equipment, identify the possible root causes, and address them before failure occurs. It is not necessary but possible to aggregate these trends and patterns across equipment of similar makes, models, and even "vibration signatures" to achieve higher fidelity with less data. By understanding failure modes and fault patterns of similar equipment, the embodiments are able to make predictions and recommendations to help prevent these failures before they occur.

In one example, the data model is structured to include a selectable user interface (UI) element. The selectable UI element is associated with a first portion of the first standardized data. Also, the selectable UI element, when selected, displays a second portion of the non-standardized data. Notably, the first portion of the first standardized data is related to the second portion of the non-standardized data.

Optionally, the data model is supplemented with additional standardized data originating from other assets and/or from other instances (e.g., same make and model) as the instant asset, but that data comes from other clients who have the same type of asset.

Method 1300 continues in FIG. 13B. Specifically, method 1300 includes an act (act 1340) of facilitating, via the one or more APIs and the data model, one or more additional operations. For instance, one operation is recited in act 1340A, which includes identification of an anomaly of the first asset based, at least in part, on the first performance trend. Another operation is recited in act 1340B, which includes forecasting when a part of the first asset is due for replacement. Another operation is recited in act 1340C, which includes identifying an alternative replacement part for the first asset, where the alternative replacement part is an alternative for an original equipment manufacturer (OEM) part for the asset. Another operation is recited in act 1340D, which includes modification of a performance of the first asset, where the modification of the performance is based on a determination that the modification will result in a prolonging of a lifespan of the first asset.

Additional Benefits, Advantages, and Practical Applications

Advantageously, the disclosed embodiments are directed to an intelligent document processing pipeline involving a multi-stage LLM workflow that intelligently extracts and structures maintenance procedures, parts, specifications, and so on. The disclosed principles enable efficient handling of complex technical documentation with hierarchical extraction.

The embodiments also provide a smart parts classification system that integrates multiple data sources for parts classification. The embodiments can identify cross-organizational parts usage patterns, perform technical documentation analysis, maintain historical records, and implement a dynamic parts recommendation engine based on asset-specific usage patterns within an organization as well as cross organizational assets/parts trends.

The disclosed embodiments also implement an improved parts inventory management system. This system allows for the use of parts classification insights and historical data to proactively create purchase orders and assign them to the most relevant user. A predictive maintenance intelligence system, which is disclosed herein, also innovatively combines sensor data analysis, historical work order patterns, technical documentation insights, proactive fault detection, and work/purchase order generation.

Example Computer Systems

Figure 14:
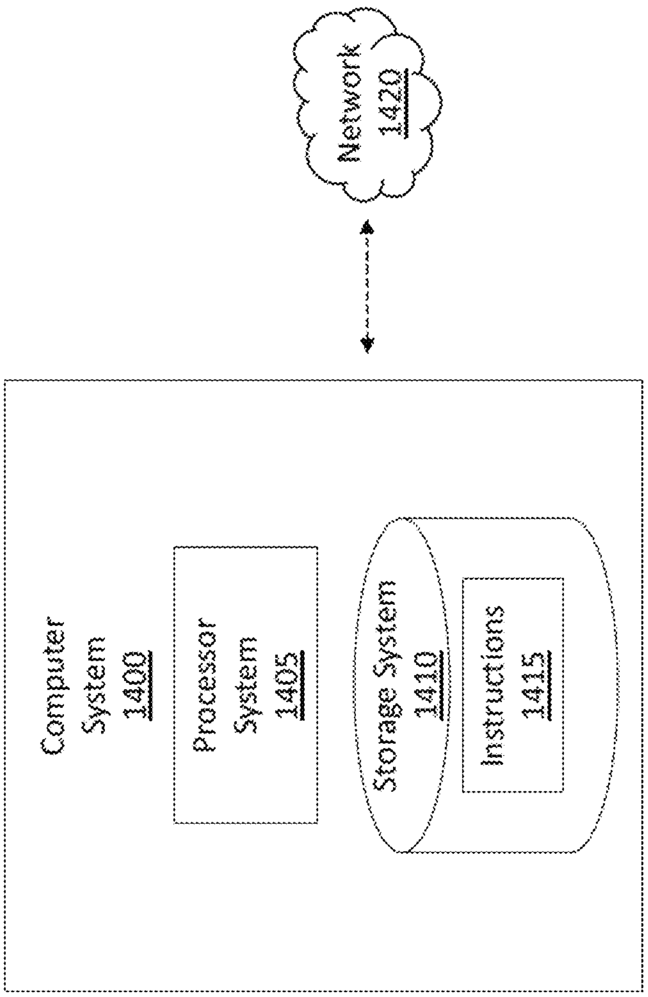
FIG. 14 illustrates an example computer system that can be configured to perform any of the disclosed operations.

Attention will now be directed to FIG. 14 which illustrates an example computer system 1400 that can include and/or be used to perform any of the operations described herein. Computer system 1400 can take various different forms. For example, computer system 1400 can be embodied as a tablet, a desktop, a laptop, a mobile device, or a standalone device, such as those described throughout this disclosure. Computer system 1400 can also be a distributed system that includes one or more connected computing components/devices that are in communication with computer system 1400. Computer system 1400 can implement the architecture 100 of FIG. 1, and computer system 1400 can host the service 105.

In its most basic configuration, computer system 1400 includes various different components. FIG. 14 shows that computer system 1400 includes a processor system 1405 that includes one or more processor(s) and a storage system 1410.

Regarding the processor(s) of the processor system 1405, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that can be executed on computer system 1400. The different components, modules, engines, and services described herein can be implemented as objects or processors that execute on computer system 1400 (e.g. as separate threads).

Storage system 1410 can be physical system memory, which can be volatile, non-volatile, or some combination of the two. The term "memory" can also be used herein to refer to non-volatile mass storage such as physical storage media. If computer system 1400 is distributed, the processing, memory, and/or storage capability can be distributed as well.

Storage system 1410 is shown as including executable instructions 1415. The executable instructions 1415 represent instructions that are executable by the processor(s) of the processor system 1405 to perform the disclosed operations, such as those described in the various methods.

The disclosed embodiments can comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 can also be connected (via a wired or wireless connection) to external sensors (e.g., one or more remote cameras) or devices via a network 1420. For example, computer system 1400 can communicate with any number devices or cloud services to obtain or process data. In some cases, network 1420 can itself be a cloud network. Furthermore, computer system 1400 can also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that at least some embodiments can be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. At least some embodiments can also be practiced in distributed system environments where local and remote computer systems that are linked (either by hardwired data links, wireless data links, or by a combination of hardwired and wireless data links) through a network perform tasks (e.g. cloud computing, cloud services and the like). In a distributed system environment, program modules can be located in both local and remote memory storage devices.

The present invention can be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for standardizing asset metadata and for facilitating access to resulting standardized data via one or more application programming interfaces (APIs), said method being implemented by a service and comprising:

receiving non-standardized data comprising data that includes: (i) first asset metadata describing a first physical asset and second asset metadata describing a second physical asset, said first asset metadata being obtained from a first domain that is associated with an original equipment manufacturer (OEM) of the first physical device and having a first format and said second asset metadata being obtained from a second domain that is independent of an original equipment manufacturer (OEM) of the second physical device and having a second, different format, and (ii) first sensor data obtained from one or more sensors associated with the first physical asset and second sensor data obtained from one or more sensors associated with the second physical asset;

converting the first format of the first asset metadata, which is included in the non-standardized data, into a standardized format, resulting in generation of first standardized data, wherein the first standardized data is included in a first hierarchically organized data structure comprising a plurality of defined categories into which various portions of the first standardized data are categorized;

converting the second format of the second asset metadata, which is also included in the non-standardized data, into the same standardized format, resulting in generation of second standardized data, wherein:

the same standardized format includes a same predefined number of levels and a same predefined number of the plurality of defined categories in each level for asset metadata using the same standardized format; and the second standardized data is included in a second hierarchically organized data structure that also includes the same plurality of the defined categories into which various portions of the second standardized data are also categorized, wherein a first category included in a particular hierarchical position in the second hierarchically organized data structure represents a same category as a first category included in a corresponding hierarchical position in the first hierarchically organized data structure;

generating a first performance trend for the first physical asset using the first sensor data;

generating a second performance trend for the second physical asset using the second sensor data;

generating a data model based at least in part on the first standardized data, the second standardized data, the first performance trend, and the second performance trend, including by performing an Internet search to find content to update the data model with using a search term that is obtained from at least one of: the first standardized data or the second standardized data; and providing access to the data model via one or more APIs.

2. The method of claim 1, wherein the method further includes the service communicating with an Internet of Things (IoT) device that controls a condition associated with the first physical asset, and wherein controlling the condition associated with the first physical asset results in a modification to a performance of the first physical asset.

3. The method of claim 1, wherein the first domain is one of a user manual domain, a procedure manual domain, or a parts inventory manual domain, and wherein the method further includes executing optical character recognition (OCR) on the first asset metadata.

4. The method of claim 1, wherein converting the first format of the first asset metadata to the standardized format includes:

executing optical character recognition (OCR) on the first asset metadata, resulting in generation of a set of tokens for the first asset metadata;

causing a large language model (LLM) agent to classify at least some of the set of tokens into a least some of the categories included in the plurality of defined categories, such that the LLM agent generates classified tokens;

generating a plurality of different groups of classified tokens by grouping together specific classified tokens that are identified as belonging to a common category; and inserting the plurality of different groups of classified tokens into the first hierarchically organized data structure, wherein said inserting includes organizing the plurality of different groups of classified tokens according to their respective categories.

5. The method of claim 1, wherein the service includes a large language model (LLM) agent.

6. The method of claim 1, wherein the service includes a generative pre-trained transformer (GPT).

7. The method of claim 1, wherein the first physical asset is an industrial machine included in a factory environment.

8. The method of claim 1, wherein the one or more APIs includes an anomaly detection API.

9. The method of claim 1, wherein the one or more APIs includes a forecasting API.

10. The method of claim 1, wherein the one or more APIs includes an optimization API.

11. A computer system that standardizes asset metadata and that facilitates access to resulting standardized data via one or more application programming interfaces (APIs), said computer system comprising:

a processor; and a storage coupled to the processor and configured to store instructions that are executable by the processor to cause the computer system to:

receive non-standardized data comprising data that includes: (i) first asset metadata describing a first physical asset and second asset metadata describing a second physical asset, said first asset metadata being obtained from a first domain that is associated with an original equipment manufacturer (OEM) of the first physical device and having a first format and said second asset metadata being obtained from a second domain that is independent of an original equipment manufacturer (OEM) of the second physical device and having a second, different format, and (ii) first sensor data obtained from one or more sensors associated with the first physical asset and second sensor data obtained from one or more sensors associated with the second physical asset;

convert the first format of the first asset metadata, which is included in the non-standardized data, into a standardized format, resulting in generation of first standardized data, wherein the first standardized data is included in a first hierarchically organized data structure comprising a plurality of defined categories into which various portions of the first standardized data are categorized;

convert the second format of the second asset metadata, which is also included in the non-standardized data, into the same standardized format, resulting in generation of second standardized data, wherein:

the same standardized format includes a same predefined number of levels and a same predefined number of the plurality of defined categories in each level for asset metadata using the same standardized format; and the second standardized data is included in a second hierarchically organized data structure that also includes the same plurality of the defined categories into which various portions of the second standardized data are also categorized, wherein a first category included in a particular hierarchical position in the second hierarchically organized data structure represents a same category as a first category included in a corresponding hierarchical position in the first hierarchically organized data structure;

generate a first performance trend for the first physical asset using the first sensor data;

generate a second performance trend for the second physical asset using the second sensor data;

generate a data model based at least in part on the first standardized data, the second standardized data, the first performance trend, and the second performance trend, including by performing an Internet search to find content to update the data model with using a search term that is obtained from at least one of: the first standardized data or the second standardized data; and provide access to the data model via one or more APIs.

12. The computer system of claim 11, wherein the data model is structured to include a selectable user interface (UI) element, wherein the selectable UI element is associated with a first portion of the first standardized data, wherein the selectable UI element, when selected, displays a second portion of the non-standardized data, and wherein said first portion of the first standardized data is related to the second portion of the non-standardized data.

13. The computer system of claim 11, wherein the data model is supplemented with additional standardized data originating from other assets.

14. The computer system of claim 11, wherein the one or more APIs includes an anomaly API that is used by a large language model (LLM) agent in identifying a cause for a detected anomaly associated with the first physical asset, and wherein the LLM agent, via the anomaly API, identifies the detected anomaly based, at least in part, on the first performance trend.

15. The computer system of claim 11, wherein the one or more APIs includes a forecasting API that is used by a large language model (LLM) agent in forecasting when a part for the first physical asset is due for replacement.

16. The computer system of claim 11, wherein the one or more APIs includes a forecasting API that is used by a large language model (LLM) agent in identifying an alternative replacement part for the first physical asset, where the alternative replacement part is an alternative for an original equipment manufacturer (OEM) part for the first physical asset.

17. The computer system of claim 11, wherein the one or more APIs includes an optimization API that is used by a large language model (LLM) agent in facilitating modification of a performance of the first physical asset, where the modification of the performance is based on a determination that said modification will result in a prolonging of a lifespan of the first physical asset.

18. The computer system of claim 17, wherein said modification is tested using a digital twin for the first physical asset.

19. The computer system of claim 17, wherein said modification is a deviation from a recommended operational state of the first physical asset.

20. One or more hardware storage devices that store instructions that standardize asset metadata and that facilitate access to resulting standardized data via one or more application programming interfaces (APIs) and that are executable by one or more processors to cause the one or more processors to:

receive non-standardized data comprising data that includes: (i) first asset metadata describing a first physical asset and second asset metadata describing a second physical asset, said first asset metadata being obtained from a first domain that is associated with an original equipment manufacturer (OEM) of the first physical device and having a first format and said second asset metadata being obtained from a second domain that is independent of an original equipment manufacturer (OEM) of the second physical device and having a second, different format, and (ii) first sensor data obtained from one or more sensors associated with the first physical asset and second sensor data obtained from one or more sensors associated with the second physical asset;

convert the first format of the first asset metadata, which is included in the non-standardized data, into a standardized format, resulting in generation of first standardized data, wherein the first standardized data is included in a first hierarchically organized data structure comprising a plurality of defined categories into which various portions of the first standardized data are categorized;

convert the second format of the second asset metadata, which is also included in the non-standardized data, into the same standardized format, resulting in generation of second standardized data, wherein:

the same standardized format includes a same predefined number of levels and a same predefined number of the plurality of defined categories in each level for asset metadata using the same standardized format; and the second standardized data is included in a second hierarchically organized data structure that also includes the same plurality of the defined categories into which various portions of the second standardized data are also categorized, wherein a first category included in a particular hierarchical position in the second hierarchically organized data structure represents a same category as a first category included in a corresponding hierarchical position in the first hierarchically organized data structure;

generate a first performance trend for the first physical asset using the first sensor data;

generate a second performance trend for the second physical asset using the second sensor data;

generate a data model based at least in part on the first standardized data, the second standardized data, the first performance trend, and the second performance trend, including by performing an Internet search to find content to update the data model with using a search term that is obtained from at least one of: the first standardized data or the second standardized data; and provide access to the data model via one or more APIs.

* * * * *